US012712727B2

(12) United States Patent
Gilburd et al.

(10) Patent No.: US 12,712,727 B2
(45) Date of Patent: Aug. 18, 2026

(54) PROVIDING CUSTOMERS VISIBILITY INTO SECURITY AND COMPLIANCE OF SERVICES IN A CUSTOMER CLOUD INFRASTRUCTURE ENVIRONMENT

(71) Applicant: Oracle International Corporation, Redwood Shores, CA (US)

(72) Inventors: Zachary Gilburd, Seattle, WA (US); Nachiketh Rao Potlapally, Seattle, WA (US); Qingyang Luo, Seattle, WA (US); Kevin Yurica, Seattle, WA (US); Karl Miller, Seattle, WA (US); Benjamin Di Qual, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 124 days.

(21) Appl. No.: 18/648,185

(22) Filed: Apr. 26, 2024

(65) Prior Publication Data

US 2024/0364747 A1 Oct. 31, 2024

Related U.S. Application Data

(60) Provisional application No. 63/462,880, filed on Apr. 28, 2023.

(51) Int. Cl.
*H04L 9/08* (2006.01)
*H04L 9/40* (2022.01)
*H04L 67/10* (2022.01)

(52) U.S. Cl.
CPC ............ *H04L 9/0891* (2013.01); *H04L 63/10* (2013.01); *H04L 63/102* (2013.01); *H04L 63/20* (2013.01); *H04L 67/10* (2013.01)

(58) Field of Classification Search
CPC ..... H04L 63/10; H04L 63/102; H04L 63/107; H04L 63/0272; H04L 63/20; H04L 67/10; H04L 9/0891
See application file for complete search history.

(56) References Cited

U.S. PATENT DOCUMENTS 8,113,959 B2 2/2012 De Judicibus
8,161,173 B1 4/2012 Mishra et al.
(Continued)

FOREIGN PATENT DOCUMENTS

CA 2804864 C 11/2018
CA 3159014 A1 6/2021
(Continued)

OTHER PUBLICATIONS

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.
(Continued)

*Primary Examiner* — Kyung H Shin
(74) *Attorney, Agent, or Firm* — Invoke

(57) ABSTRACT

Techniques for presenting information indicating infrastructure security and compliance of services of a customer cloud environment to a customer-facing dashboard are disclosed. The information presented to the customer-facing dashboard is a subset of information available to operators associated with a cloud service provider (CSP). A tier-one dashboard service obtains information indicating infrastructure security and compliance of services in the customer cloud infrastructure environment. The tier-one dashboard service presents the information indicating infrastructure security and compliance to CSP operators on a CSP-facing dashboard. The CSP-facing dashboard is not accessible by customer operators. A tier-two dashboard service obtains the infrastructure security and compliance information from the tier-one dashboard service and filters the infrastructure security information to create a subset of information indicating the security and compliance of the services. The subset of infrastructure security and compliance information is presented to opera- (Continued)

tors associated with a customer of the CSP on a customer-facing dashboard.

18 Claims, 13 Drawing Sheets

(56) References Cited

U.S. PATENT DOCUMENTS 8,214,398 B1 7/2012 Cowan et al.
9,092,502 B1 7/2015 Cannaliato et al.
9,137,093 B1 * 9/2015 Abraham ................ H04L 61/00
9,306,814 B1 4/2016 Roth et al.
9,438,599 B1 9/2016 Yuhan et al.
9,569,630 B2 2/2017 Cabrera et al.
9,722,895 B1 8/2017 Sarukkai et al.
9,824,390 B2 11/2017 Adapalli et al.
9,876,703 B1 1/2018 Arllen et al.
9,985,947 B1 5/2018 Elhard
10,021,084 B2 7/2018 Matthews et al.
10,061,932 B1 8/2018 Combs et al.
10,089,476 B1 10/2018 Roth et al.
10,122,717 B1 11/2018 Reddy et al.
10,261,782 B2 4/2019 Suarez et al.
10,270,759 B1 4/2019 Bordelon et al.
10,318,265 B1 6/2019 To et al.
10,411,975 B2 9/2019 Martinez et al.
10,511,675 B1 12/2019 Chud
10,528,995 B2 1/2020 Maes
10,554,418 B2 2/2020 Kshirsagar et al.
10,567,360 B2 2/2020 Nirwal et al.
10,757,574 B1 8/2020 Rule et al.
10,878,483 B1 12/2020 Felbinger et al.
10,956,600 B2 3/2021 Ye et al.
10,974,516 B2 4/2021 Moriya
11,121,985 B2 9/2021 Cidon et al.
11,321,137 B2 5/2022 Barsalou et al.
11,323,477 B1 5/2022 Kumar et al.
11,379,353 B1 7/2022 Marchetti et al.
11,444,925 B1 9/2022 Patimer et al.
11,537,745 B2 12/2022 Yang et al.
11,552,953 B1 1/2023 Avadhanam
11,574,151 B2 2/2023 Wang et al.
11,575,508 B2 2/2023 Anand et al.
11,587,458 B2 2/2023 Lowensohn
11,593,251 B2 2/2023 Chirkin et al.
11,604,672 B2 3/2023 Subramanian et al.
11,652,616 B2 5/2023 Zee et al.
11,689,475 B2 6/2023 Goyal
11,720,536 B1 8/2023 Kisser et al.
11,727,464 B2 8/2023 Eisenstein et al.
11,853,753 B1 12/2023 Chawda et al.
11,936,678 B2 3/2024 Pieczul et al.
11,954,238 B1 4/2024 Tan et al.
12,021,888 B1 6/2024 Reed et al.
12,067,493 B2 8/2024 Zhang et al.
12,143,917 B2 11/2024 Raffa et al.
12,164,652 B1 12/2024 Li et al.
12,363,148 B1 7/2025 Anil et al.
12,445,419 B2 10/2025 Adogla et al.
12,457,204 B2 10/2025 Adogla et al.
12,475,015 B2 11/2025 Peterson et al.
12,487,833 B2 12/2025 Peterson et al.
2002/0026592 A1 2/2002 Gavrila et al.
2002/0198973 A1 12/2002 Besaw
2003/0135593 A1 * 7/2003 Lee ......................... H04L 41/22
709/223
2003/0154407 A1 8/2003 Kato et al.
2005/0198331 A1 9/2005 Okajima et al.
2007/0124374 A1 5/2007 Arun et al.
2007/0168531 A1 * 7/2007 Sitaraman ........... H04L 12/2856
709/229
2009/0164499 A1 6/2009 Samudrala et al.
2009/0165078 A1 6/2009 Samudrala et al.
2009/0205018 A1 8/2009 Ferraiolo et al.
2010/0106678 A1 4/2010 Pietrek et al.
2010/0131624 A1 5/2010 Ferris
2010/0153865 A1 6/2010 Barnes et al.
2010/0212004 A1 8/2010 Fu
2011/0167435 A1 7/2011 Fang
2011/0277017 A1 11/2011 Ivanov et al.
2012/0131162 A1 5/2012 Brandt et al.
2013/0054426 A1 2/2013 Rowland et al.
2013/0111027 A1 5/2013 Milojicic et al.
2013/0111609 A1 5/2013 Resch et al.
2013/0226699 A1 8/2013 Long
2013/0282540 A1 10/2013 Bliesner
2013/0282798 A1 10/2013 Mccarthy et al.
2013/0297711 A1 11/2013 Nhu
2013/0304925 A1 11/2013 Ferris et al.
2013/0339515 A1 12/2013 Radhakrishnan
2014/0007041 A1 1/2014 Schmeling et al.
2014/0075565 A1 3/2014 Srinivasan et al.
2014/0089393 A1 3/2014 Druet et al.
2014/0095546 A1 4/2014 Kruglikov et al.
2014/0188938 A1 7/2014 Banks et al.
2014/0236745 A1 8/2014 Vautour
2014/0280595 A1 9/2014 Mani et al.
2015/0089575 A1 3/2015 Vepa et al.
2015/0106736 A1 4/2015 Torman et al.
2015/0358161 A1 12/2015 Kancharla et al.
2015/0363852 A1 12/2015 Vautour
2015/0372938 A1 12/2015 Patel et al.
2016/0043909 A1 2/2016 Pogrebinsky et al.
2016/0110553 A1 4/2016 Factor et al.
2016/0125489 A1 5/2016 Gupte et al.
2016/0132806 A1 5/2016 To et al.
2016/0139737 A1 5/2016 Conn et al.
2016/0142211 A1 5/2016 Metke et al.
2016/0277411 A1 9/2016 Dani et al.
2016/0294881 A1 10/2016 Hua et al.
2017/0006119 A1 1/2017 Pogrebinsky et al.
2017/0069011 A1 3/2017 Akkiraju et al.
2017/0111331 A1 4/2017 Auradkar et al.
2017/0111446 A1 4/2017 Rivera et al.
2017/0116334 A1 4/2017 Kruglikov et al.
2017/0201525 A1 7/2017 Biller et al.
2017/0230229 A1 8/2017 Sasturkar et al.
2017/0323112 A1 11/2017 Tran et al.
2017/0373860 A1 12/2017 Kshirsagar et al.
2018/0025399 A1 1/2018 Nedeltchev et al.
2018/0052861 A1 2/2018 Seetharaman et al.
2018/0137261 A1 5/2018 Lattin et al.
2018/0176023 A1 6/2018 Prickett et al.
2018/0191718 A1 7/2018 Kuzkin et al.
2018/0212778 A1 7/2018 Novak
2018/0219784 A1 8/2018 Jiang et al.
2018/0234256 A1 8/2018 Bowen
2018/0356964 A1 12/2018 Morris
2018/0373521 A1 12/2018 Huang et al.
2019/0020659 A1 1/2019 Loni et al.
2019/0068622 A1 * 2/2019 Lin ..................... H04L 63/1441
2019/0087835 A1 3/2019 Schwed et al.
2019/0104035 A1 4/2019 Cidon et al.
2019/0114335 A1 4/2019 Koenig et al.
2019/0132299 A1 5/2019 Tucker et al.
2019/0149417 A1 5/2019 Augusto et al.
2019/0156000 A1 5/2019 Hoffmann et al.
2019/0166007 A1 5/2019 Sundaram et al.
2019/0182153 A1 6/2019 Gundavelli et al.
2019/0190917 A1 6/2019 Joe
2019/0332789 A1 10/2019 Vandenbrouck et al.
2019/0334917 A1 10/2019 Demmler et al.
2019/0354692 A1 11/2019 Thoram et al.
2019/0362087 A1 11/2019 Ferrans et al.
2020/0004569 A1 1/2020 Gupta et al.
2020/0014659 A1 1/2020 Chasman et al.
2020/0042675 A1 2/2020 Asanghanwa et al.
2020/0097315 A1 3/2020 Faynberg et al.
2020/0112497 A1 4/2020 Yenumulapalli et al.
2020/0117757 A1 4/2020 Yanamandra et al.
2020/0244527 A1 7/2020 Sharma et al.
2020/0244549 A1 7/2020 Finch et al.
2020/0250661 A1 8/2020 Padmanabhan et al.
2020/0358756 A1 11/2020 Rose et al.

(56) References Cited

U.S. PATENT DOCUMENTS

2020/0366716 A1 11/2020 Singh et al.
2020/0389463 A1 12/2020 Chen
2021/0036851 A1 2/2021 Villapakkam et al.
2021/0067372 A1 3/2021 Cidon et al.
2021/0075870 A1 3/2021 Kempf et al.
2021/0084048 A1 3/2021 Kannan et al.
2021/0142276 A1 5/2021 Gupte
2021/0182940 A1 6/2021 Gupta et al.
2021/0216190 A1 7/2021 Vakil et al.
2021/0218722 A1 7/2021 Gaylor et al.
2021/0224076 A1 7/2021 Dockter et al.
2021/0224132 A1 7/2021 Barsalou
2021/0224409 A1 7/2021 Avanes et al.
2021/0226956 A1 7/2021 Wei et al.
2021/0234864 A1 7/2021 Dube et al.
2021/0273914 A1 9/2021 Cobb
2021/0279109 A1 9/2021 Ji et al.
2021/0334345 A1 10/2021 Sim et al.
2021/0368514 A1 11/2021 Xing
2021/0377272 A1 12/2021 Dasari et al.
2021/0377276 A1 12/2021 Dasari et al.
2021/0382725 A1 12/2021 Vemula et al.
2021/0383325 A1 12/2021 Loupos et al.
2021/0392048 A1 12/2021 Olden et al.
2021/0392142 A1 12/2021 Stephens et al.
2021/0409403 A1 12/2021 Lewin et al.
2022/0038449 A1 2/2022 Tripp et al.
2022/0091947 A1 3/2022 Kothari et al.
2022/0103566 A1 3/2022 Faulkner
2022/0103618 A1 3/2022 Pinheiro et al.
2022/0116285 A1 4/2022 Abdollahi et al.
2022/0129575 A1 4/2022 Goel et al.
2022/0150124 A1 5/2022 Cooley et al.
2022/0159010 A1 5/2022 Bandarupalli et al.
2022/0244949 A1 8/2022 Iqbal et al.
2022/0255902 A1 8/2022 Woodson
2022/0263793 A1 8/2022 Baker et al.
2022/0271929 A1 8/2022 Villapakkam et al.
2022/0294818 A1 9/2022 Parekh et al.
2022/0335340 A1 10/2022 Moustafa et al.
2022/0353133 A1 11/2022 Shrestha et al.
2022/0365835 A1 11/2022 Kandasamy et al.
2022/0368813 A1 11/2022 Rossignol et al.
2022/0374271 A1 11/2022 Pogrebinsky et al.
2022/0398078 A1 12/2022 Segler
2022/0405152 A1 12/2022 Edamadaka et al.
2022/0413956 A1 12/2022 Mathew et al.
2023/0006889 A1 1/2023 Thyagaturu et al.
2023/0011628 A1 1/2023 Hurley et al.
2023/0068221 A1 3/2023 Magowan et al.
2023/0086475 A1 3/2023 Mosko
2023/0104368 A1 4/2023 Miriyala et al.
2023/0105901 A1 4/2023 Adogla et al.
2023/0108661 A1 4/2023 Adogla et al.
2023/0109926 A1 4/2023 Nair et al.
2023/0110527 A1 4/2023 Bhat et al.
2023/0116463 A1 4/2023 Rath et al.
2023/0132478 A1 5/2023 Robinson et al.
2023/0224304 A1 7/2023 Lukanov et al.
2023/0315726 A1 10/2023 Ponjavic et al.
2023/0316348 A1 10/2023 Dageville et al.
2023/0342179 A1 10/2023 Suttle et al.
2023/0362161 A1 11/2023 Spector et al.
2023/0367654 A1 11/2023 Kurian et al.
2023/0370461 A1 11/2023 Kalley et al.
2023/0385286 A1 11/2023 Glickman et al.
2024/0015164 A1 1/2024 Guy et al.
2024/0015165 A1 1/2024 Guy et al.
2024/0053973 A1 2/2024 Ranganathan et al.
2024/0054063 A1 2/2024 Wichelman et al.
2024/0069884 A1 2/2024 Majumdar et al.
2024/0095056 A1 3/2024 Adogla et al.
2024/0095390 A1 3/2024 Chao et al.
2024/0095739 A1 3/2024 Adogla et al.
2024/0095809 A1 3/2024 Adogla et al.
2024/0095865 A1 3/2024 Adogla et al.
2024/0098088 A1 3/2024 Adogla et al.
2024/0098089 A1 3/2024 Adogla et al.
2024/0103818 A1 3/2024 Gallagher et al.
2024/0106832 A1 3/2024 Adogla et al.
2024/0137339 A1 4/2024 Vemulpali
2024/0143351 A1 5/2024 Davis
2024/0171586 A1 5/2024 Jain et al.
2024/0179146 A1 5/2024 Pinski et al.
2024/0184465 A1 6/2024 Zwiegincew et al.
2024/0205235 A1 6/2024 Batni
2024/0232408 A1 7/2024 Pan et al.
2024/0244053 A1 7/2024 Tian et al.
2024/0275853 A1 8/2024 Singh et al.
2024/0305622 A1 9/2024 Vijayan et al.
2024/0320240 A1 9/2024 Podder
2024/0330069 A1 10/2024 Atur et al.
2024/0364509 A1 10/2024 Potlapally et al.
2024/0378307 A1 11/2024 Dcosta
2024/0378518 A1 11/2024 Sparrow et al.
2024/0414169 A1 12/2024 Fang et al.
2025/0023844 A1 1/2025 Juneja et al.
2025/0077214 A1 3/2025 Banaal
2025/0106221 A1 3/2025 Wang et al.

FOREIGN PATENT DOCUMENTS

CN 102656589 A 9/2012
CN 104106276 A 10/2014
CN 108197493 A 6/2018
CN 114091725 A 2/2022
CN 118312629 A 7/2024
EP 2893685 B1 7/2017
EP 3429156 A1 1/2019
EP 3271857 B1 4/2020
WO 2010/088081 A1 8/2010
WO 2012/006638 A1 1/2012
WO 2014/039921 A1 3/2014
WO 2018/010791 A1 1/2018
WO 2019/212773 A1 11/2019
WO 2020/252088 A1 12/2020
WO 2021/051933 A1 3/2021
WO 2021/145894 A1 7/2021
WO 2021/150306 A1 7/2021
WO 2021/150307 A1 7/2021
WO 2021/150366 A1 7/2021
WO 2021/150435 A1 7/2021
WO 2021/174104 A1 9/2021
WO 2022/005992 A1 1/2022
WO 2022/104395 A1 5/2022
WO 2022/104396 A1 5/2022

OTHER PUBLICATIONS

"General Variables for All Requests", Jun. 28, 2023, pp. 6.
"Overview of Access Approval", Retrieved from https://cloud.google.com/assured-workloads/access-approval/docs/overview, Jun. 6, 2024, pp. 5.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
"Verbs", Jun. 5, 2023, pp. 2.
Anonymbus: "Tokenization -(data security)", Wikipedia, Feb. 12, 2023, pp. 1-12.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.

(56) References Cited

OTHER PUBLICATIONS

Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.
Anonymous: "Oracle Cloud Infrastructure Documentation—Security Guide for Exadata Database Service on Cloud@Customer Systems", Apr. 1, 2023, XP093181902.
Anonymous: "Oracle Cloud Infrastructure Documentation-Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.
Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
International Application No. PCT/US2023/074343, International Preliminary Report on Patentability mailed on Mar. 27, 2025, 9 pages.
International Application No. PCT/US2023/074343, International Search Report and Written Opinion, mailed on Jan. 29, 2024, 13 pages.
International Application No. PCT/US2023/074344, International Preliminary Report on Patentability mailed on Mar. 27, 2025, 10 pages.
International Application No. PCT/US2023/074344, International Search Report and Written Opinion, mailed On Dec. 19, 2023, 13 pages.
International Application No. PCT/US2024/028744, International Search Report and Written Opinion mailed on Jul. 23, 2024, 16 pages.
International Application No. PCT/US2024/028767, "International Search Report and Written Opinion", mailed Sep. 10, 2024, 13 pages.
International Application No. PCT/US2024/028788, International Search Report and Written Opinion mailed on Jul. 23, 2024, 16 pages.
International Application No. PCT/US2024/029210, "International Search Report and Written Opinion", mailed Sep. 16, 2024, 12 pages.
International Application No. PCT/US2024/029417, "International Search Report and Written Opinion", mailed Sep. 16, 2024, 12 pages.
International Application No. PCT/US2024/030201, "International Search Report and Written Opinion", mailed Sep. 16, 2024, 12 pages.
International Application No. PCT/US2024/030208, "International Search Report and Written Opinion", mailed Sep. 16, 2024, 13 pages.
International Application No. PCT/US2024/030212, "International Search Report and Written Opinion", mailed Sep. 16, 2024, 12 pages.
Krichen et al., "Towards Optimizing the Placement of Security Testing Components for Internet of Things Architectures", 2019 Institute of Electrical and Electronics Engineers/ACS 16th International Conference on Computer Systems and Applications (AICCSA), 2019, 2 pages.
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.
Mampage et al., "A Holistic View on Resource Management in Serverless Computing Environments Taxonomy and Future Directions", Research Gate, ACM Computing Surveys, 2022, 34 pages.
Marketplace Management, Available online at: https://www.appxite.com/platform/manage-marketplace?hsLang=en, 2022, 4 pages.
Marketplace Setup, Available online at: https://www.appxite.com/platform/launch-marketplace?hsLang=en, 2022, 3 pages.
Microsoft Learn, "Azure Key Vault Rest API reference", Apr. 19, 2023, Available online at <https://learn.microsoft.com/en-us/rest/api/keyvault/>, 12 pages.
Microsoft Learn: "Connect to a Key Vault via private endpoint—Code Samples", Jul. 6, 2022, Available online at <https://learn.microsoft.com/en-us/samples/azure/azure-quickstart-templates/key-vault-private-endpoint/>, 5 pages.
Nolle, "Operational Strategies for Isolation in Cloud Computing", Tech Target, Sep. 15, 2021, 6 pages.
Organization Governance for Google Cloud Marketplace, Available online at: https://cloud.google.com/marketplace/docs/governance, Accessed from internet on Jan. 18, 2023, 1 page.
Palanisamy, "Cloud-based and Containerized Testing Environments Revolutionizing Text Automation", International Journal of Science and Research Archive, 2021, 11 pages.
Power your Cloud Business with StreamOne Cloud Marketplace, Available online at: https://asia.techdata.com/sg/wp-content/uploads/2021/01/SCM_TD_10.23.pdf, 2 pages.
Private Marketplace, Available online at: https://aws.amazon.com/marketplace/features/privatemarketplace, 2023, 4 pages.
Resell Cloud Marketplace Products from Independent Software Vendors (ISVs), Available online at: https://cloud.google.com/marketplace/docs/partners/resell, Accessed from internet on Jan. 18, 2023, 1 page.

(56) References Cited

OTHER PUBLICATIONS

Set up your Cloud Marketplace Products for Resale, Available online at: https://cloud.google.com/marketplace/docs/partners/resell/set-up-reselling, Accessed from internet on Jan. 18, 2023, 2 pages.
U.S. Appl. No. 18/498,964, Non-Final Office Action mailed on Jul. 29, 2025, 23 pages.
U.S. Appl. No. 18/537,902, Non-Final Office Action, mailed on May 20, 2025, 10 pages.
U.S. Appl. No. 18/368,870, Non-Final Office Action mailed on Mar. 31, 2025, 11 pages.
U.S. Appl. No. 18/368,884, Non-Final Office Action mailed on Mar. 6, 2025, 44 pages.
U.S. Appl. No. 18/468,037, Non-Final Office Action mailed on Mar. 20, 2025, 8 pages.
U.S. Appl. No. 18/468,044, Non-Final Office Action mailed on May 19, 2025, 22 pages.
U.S. Appl. No. 18/468,047, Non-Final Office Action mailed on May 23, 2025, 11 pages.
Vanbenschoten et al., "Enabling the Next Generation of Multi-Region Applications with CockroachDB", Available Online at https //www cockroachlabs com/pdf/SIGMOD2022 pdf, Jun. 11, 2022, 14 pages.
Vidich, "Microsoft Publishes Secure Isolation Guidance for Azure and Azure Government", Microsoft, Dev Blogs, Aug. 31, 2020, 6 pages.
Want to Resell Public Cloud Services?, Available online At: https://ngkloud.com/resell-public-cloud/, 2021, 3 pages.
What is AWS Marketplace, Available online at: https://docs.aws.amazon.com/marketplace/latest/userguide/what-is-marketplace.html, Accessed from internet on Jan. 18, 2023, 5 pages.
What is Azure Marketplace?, Available online At: https://learn.microsoft.com/en-us/marketplace/azure-marketplace-overview?source=recommendations, Dec. 30, 2022, 9 pages.
What is Google Cloud Marketplace?, Available online at: https://cloud.google.com/marketplace/docs, Accessed from internet on Jan. 18, 2023, 2 pages.
Yedida et al., "Partitioning Cloud-based Microservices", Research Gate, via Deep Learning, Sep. 29, 2021, 11 pages.
"Cloud External Key Manager," Retrieved from https://cloud.google.com/kms/docs/ekm, Mar. 4, 2024, pp. 5.
"CNAME Record", Wikipedia, Available Online at: https://en.wikipedia.org/w/index.php?title=CNAME_record&oldId=1105641340, Accessed from Internet on Jan. 24, 2024, 4 pages.
"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.
"Developing System Services in Oracle Solaris 11.3", Oracle, Available Online at: https://docs.oracle.com/cd/E53394_01/pdf/E60814.pdf, Sep. 1, 2018, 76 pages.
"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-08-2023.pdf, Retrieved on Jul. 30, 2024, pp. 2.
"External key stores," Retrieved from https://docs.aws.amazon.com/kms/latest/developerguide/keystore-external.html, Mar. 4, 2024, pp. 16.
"Generating and using SSH keys for remote host authentication," Retrieved from https://cloud.ibm.com/docs/ssh-keys?topic=ssh-keys-generating-and-using-ssh-keys-for-remote-host-authentication, Apr. 27, 2023, pp. 5.
"Integrating Skyhigh CASB On-Prem Proxy with aKey Management Server," Retrieved from https://success.skyhighsecurity.com/Skyhigh_CASB/Skyhigh_CASB_Settings/On-Prem_Proxy/zIntegrating_MVISION_Cloud_On-Prem_Proxy_with_a_Key_Management_Server, Sep. 3, 2021, pp. 3.
"Key Management Interoperability Protocol (KMIP)," Retrieved from https://www.encryptionconsulting.com/education-center/kmip/#:~:text=KMIP%20is%20an%20extensible%20communication,by%20simplifying%20encryption%20key%20management., Retrieved on Jul. 30, 2024, pp. 5.
"Multicloud Architecture Partitioned, Cloud Burst and DR", NetApp, Apr. 9, 2020, 7 pages.
"New: Using Amazon EC2 Instance Connect for SSH access to your EC2 Instances," Retrieved from https://aws.amazon.com/blogs/compute/new-using-amazon-ec2-instance-connect-for-ssh-access-to-your-ec2-instances/, Retrieved on Aug. 5, 2024, pp. 12.
"Sepior's Cloud Encryption Technology Now Supports Key Management Interoperability Protocol (KMIP)," Sepior, Nov. 10, 2017, pp. 4.
"SSH Certificates Management Automation Made Easy Introducing Certonid," Retrieved from https://mailtrap.io/blog/certonid/, Retrieved on Aug. 5, 2024, pp. 19.
"StorMagic-SvKMS-Data-Sheet," Retrieved from https://stormagic.com/pdf/data-sheet/StorMagic-SvKMS-Data-Sheet.pdf, 2023, pp. 4.
10 Reasons to Become an AwesomeCloud Channel Partner, Available online at: https://www.awesomecloud.com/about/why-awesomecloud/, 2023, 3 pages.
Aldossary, "A Review of Dynamic Resource Management in Cloud Computing Environments", Computer Systems Science and Engineering, vol. 36, No. 3, 2021, pp. 461-476.
Anonymous: "AWS Identity and Access Management user guide—first 400 pages", Mar. 15, 2024, https://web.archive.org/web/20240315183106if_/https://docs.aws.amazon.com/pdfs/IAM/latest/UserGuide/iam-ug.pdf, pp. 4215.
Anonymous: "IAM Roles Anywhere with an external certificate authority : AWS Security Blog", Oct. 20, 2023, Retrieved from https://aws.amazon.com/blogs/security/ iam-roles-anywhere-with-an-external-certificate-authority/, pp. 1-18.
Anonymous: "OCI Documentation—Managing Key Pairs on Linux Instances", Mar. 6, 2024, https://web.archive.org/web/20240306214752/https://docs.oracle.com/en-us/iaas/Content/Compute/Tasks/managingkeypairs.htm.
Anonymous: "OCI Documentation—Security Credentials", Dec. 11, 2023, https://web.archive.org/web/20231211222908/https://docs.oracle.com/en-us/iaas/Content/General/Concepts/credentials.htm.
Anonymous: "Set up AWS Private Certificate Authority to issue certificates for use with IAM Roles Anywhere : AWS Security Blog", Retrieved from https://aws.amazon.com/blogs/security/set-up-aws-private-certificate-authority-to-issue-certificates-for-use-with-iam-roles-anywhere/, Nov. 8, 2023, pp. 1-14.
U.S. Appl. No. 18/368,863, Non-Final Office Action, Mailed On Jun. 17, 2025, 11 pages.
U.S. Appl. No. 18/368,884, Final Office Action, Mailed On Nov. 10, 2025, 58 pages.
U.S. Appl. No. 18/468,024, Notice of Allowance, Mailed On Jun. 23, 2025, 8 pages.
U.S. Appl. No. 18/468,238 , Notice of Allowance, Mailed On Jul. 3, 2025, 9 pages.
AwesomeCloud Services, Available online at: https://www.awesomecloud.com/about/, Accessed from internet on Jan. 18, 2023, 2 pages.
Azure Marketplace Service Providers Guide, Available online at: https://docs.azure.cn/en-us/articles/azure-marketplace/publishguide, Mar. 9, 2021, 9 pages.
Bridgwater, "Location, Location, Partition How To Beat Latency As Cloud Grows", Forbes, Dec. 3, 2020, 5 pages.
Cloud Reseller Program Overview, Available online at: https://www.awesomecloud.com/cloud-reseller-program/, 2023, 3 pages.
Create a Private Marketplace, Available online at: https://cloud.google.com/marketplace/docs/governance/private-marketplace, Accessed from internet on Jan. 18, 2023, 2 pages.
Direct As-a-Service Sales Platform, Available online at: https://www.appxite.com/cloud-saas-sellers, 2022, 3 pages.
Drive Revenue by Selling in AWS Marketplace, Available online at: https://aws.amazon.com/marketplace/partners/management-tour, Accessed from internet on Jan. 18, 2023, 7 pages.
Enable Google Private Marketplace, Available online at: https://cloud.google.com/marketplace/docs/governance/enable-private-marketplace, Accessed from internet on Jan. 18, 2023, 2 pages.

(56) References Cited

OTHER PUBLICATIONS

Ferry, “Kubernetes Namespaces Isolation—What It is, What It Isn’t, Life, Universe and Everything”, SynActiv, 2021, 13 pages.
Gholipour et al., “Recent Advances in Energy-Efficient Resource Management Techniques in Cloud Computing Environments”, New Frontiers in Cloud Computing and Internet of Things, 2021, pp. 31-68.
Girola et al., “IBM Data Center Networking; Planning for Virtualization and Cloud Computing”, Redbooks, May 9, 2011, 258 pages.
Google Cloud Platform Services Summary, Available online at: https://cloud.google.com/terms/services, Accessed from internet on Jan. 18, 2023, 25 pages.
Huey Patricia et al., “Oracle Database Security Guide”, Nov. 2023, https://web.archive.org/web/20231121145008if_/https://docs.oracle.com/en/database/oracle/oracle-database/23/dbseg/database-security-guide.pdf, pp. 1327.
International Application No. PCT/US2023/074323, International Search Report and the Written Opinion, mailed on Nov. 22, 2023, 15 pages.
International Application No. PCT/US2023/074322, International Preliminary Report on Patentability mailed on Mar. 27, 2025, 9 pages.
International Application No. PCT/US2023/074322, International Search Report and Written Opinion, mailed on Nov. 22, 2023, 12 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074325, International Search Report and the Written Opinion, mailed on Nov. 22, 2023, 13 pages.
International Application No. PCT/US2023/074330, International Preliminary Report on Patentability mailed on Mar. 27, 2025, 10 pages.
International Application No. PCT/US2023/074330, International Search Report and the Written Opinion, mailed on Dec. 19, 2023, 14 pages.
International Application No. PCT/US2023/074341, International Preliminary Report on Patentability mailed on Mar. 27, 2025, 11 pages.
International Application No. PCT/US2023/074341, International Search Report and Written Opinion, mailed on Dec. 8, 2023, 15 pages.
International Application No. PCT/US2023/074342, International Preliminary Report on Patentability mailed on Mar. 27, 2025, 10 pages.
International Application No. PCT/US2023/074342, International Search Report and Written Opinion, mailed on Dec. 8, 2023, 13 pages.
U.S. Appl. No. 18/498,964 , Notice of Allowance, Mailed On Nov. 18, 2025, 10 pages.
E2E Network Slicing—Key 5G technology—What is it? Why do we need it? How do we implement it? By Harrison et al.(Year: 2015).
U.S. Appl. No. 18/647,735, Non-Final Office Action mailed on Jul. 21, 2025, 25 pages.
U.S. Appl. No. 18/647,741, Non-Final Office Action mailed on Nov. 4, 2025, 17 pages.
U.S. Appl. No. 18/647,893, Notice of Allowance mailed on Sep. 15, 2025, 9 pages.
U.S. Appl. No. 18/647,971, Non-Final Office Action mailed on Oct. 10, 2025, 16 pages.

* cited by examiner

System 1100

Customer Operator Interface 1104

Customer-Facing Dashboard 1142

Widgets 1144

CSP Operator Interface 1106

CSP-Facing Dashboard 1146

Cloud Infrastructure Environment 1102

Infrastructure Services 1108

Data Collectors 1110

Tier-One Dashboard Service 1112

Application Programing Interfaces 1114

Permissions Service 1116

Tier-Two Dashboard Service 1118

Configuration Manager 1122

Privacy Filtering Engine 1124

Security Insight Engine 1126

Universal Compliance Engine 1128

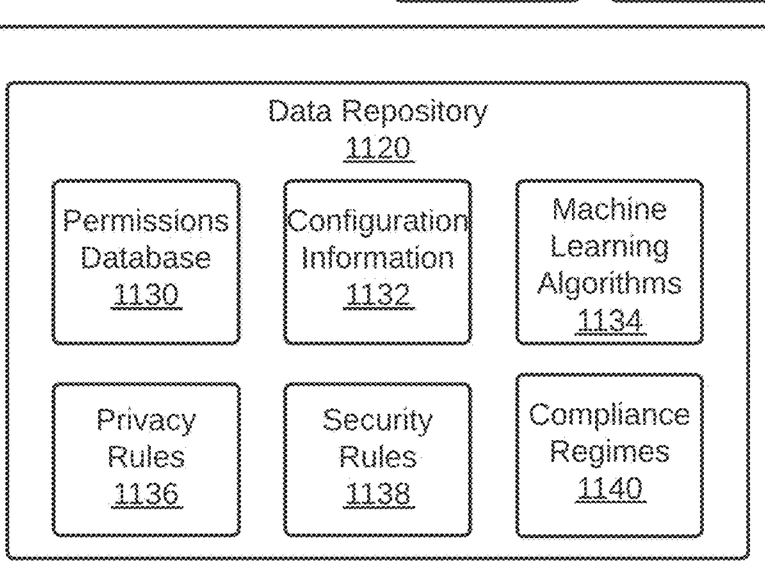

*FIGURE 11A*

Security Oversight Dashboard 1300

Security Notifications 1302

0 Required action

0 Scheduled Maintenance

All systems operational 1306

All systems operational

View health dashboard

Help 1308

- Routine Notification or Issue
- Urgent Notification or Issue

Security Support Tickets 1304

Create Support Request

| Issue Summary | SR Number | Status | Severity | Update |
|---|---|---|---|---|
| Access log file request for operattor tenancy: OCID: pcid1.tenancy.oc1..aaaaaaaa4yalk3rot | SR265539 | Close Request | Standard | Tue, 31 Jan 2023 17:56:40 |
| Processing delay when deploying SZ | SR262023 | Pending with Customer | Standard | Tue, 31 Jan 2023 17:32:40 |
| Processing delay when deploying SZ | SR262024 | Pending with Customer | Standard | Tue, 31 Jan 2023 17:32:40 |
| Access log file request for operattor tenancy: PCID: pcid1.tenancy.oc1..aaaaaaaa4yalk3rot | 3-2736327701 | Pending with Provider | Standard | Tue, 31 Jan 2023 17:56:40 |
| Access log file request for operattor tenancy: PCID: pcid1.tenancy.oc1..aaaaaaaa4yalk3rot | 3-2736327701 | Pending with Provider | Standard | Tue, 31 Jan 2023 17:56:40 |
| Access log file request for operattor tenancy: PCID: pcid1.tenancy.oc1..aaaaaaaa4yalk3rot | 3-2736327701 | Pending with Provider | Standard | Tue, 31 Jan 2023 17:56:40 |

*FIGURE 13*

PROVIDING CUSTOMERS VISIBILITY INTO SECURITY AND COMPLIANCE OF SERVICES IN A CUSTOMER CLOUD INFRASTRUCTURE ENVIRONMENT

BENEFIT CLAIMS; RELATED APPLICATIONS; INCORPORATION BY REFERENCE

Each of the following applications are hereby incorporated by reference: Application No. 63/462,880 filed on Apr. 28, 2023. The Applicant hereby rescinds any disclaimer of claim scope in the parent application(s) or the prosecution history thereof and advises the USPTO that the claims in this application may be broader than any claim in the parent application(s).

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloud environments. In particular, the present disclosure relates to providing visibility into security and compliance of services in a customer cloud infrastructure environment to customers of the cloud service provider.

BACKGROUND

A cloud computing environment can be used to provide access to a range of complementary cloud-based components, such as software applications or services, that enable organizations or enterprise customers to operate their applications and services in a highly available hosted environment.

The benefits to an organization in moving their application and service needs to a cloud environment include a reduction in the cost and complexity of designing, building, operating, and maintaining their own on-premises data center, software application framework, or other information technology infrastructure.

An operator associated with a cloud service provider (CSP), i.e., CSP operator, has access to a plethora of information indicating security and compliance of services in a customer cloud infrastructure. Security and compliance information include logs and other data from numerous teams from numerous services. The information may be structured or unstructured. The CSP operator accesses the information through one or more infrastructure service dashboards. Customers of the CSP do not have the same access to the security and compliance information.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 11A and 11B illustrate a system for providing visibility into security and compliance of services in a customer cloud infrastructure environment to customers of the cloud service provider (CSP) in accordance with one or more embodiments;

FIG. 13 illustrates a customer-facing dashboard for presenting security and compliance information associated with services in a customer cloud infrastructure environment to a customer of the CSP in accordance with one or more embodiments.

DETAILED DESCRIPTION

Figure 1:
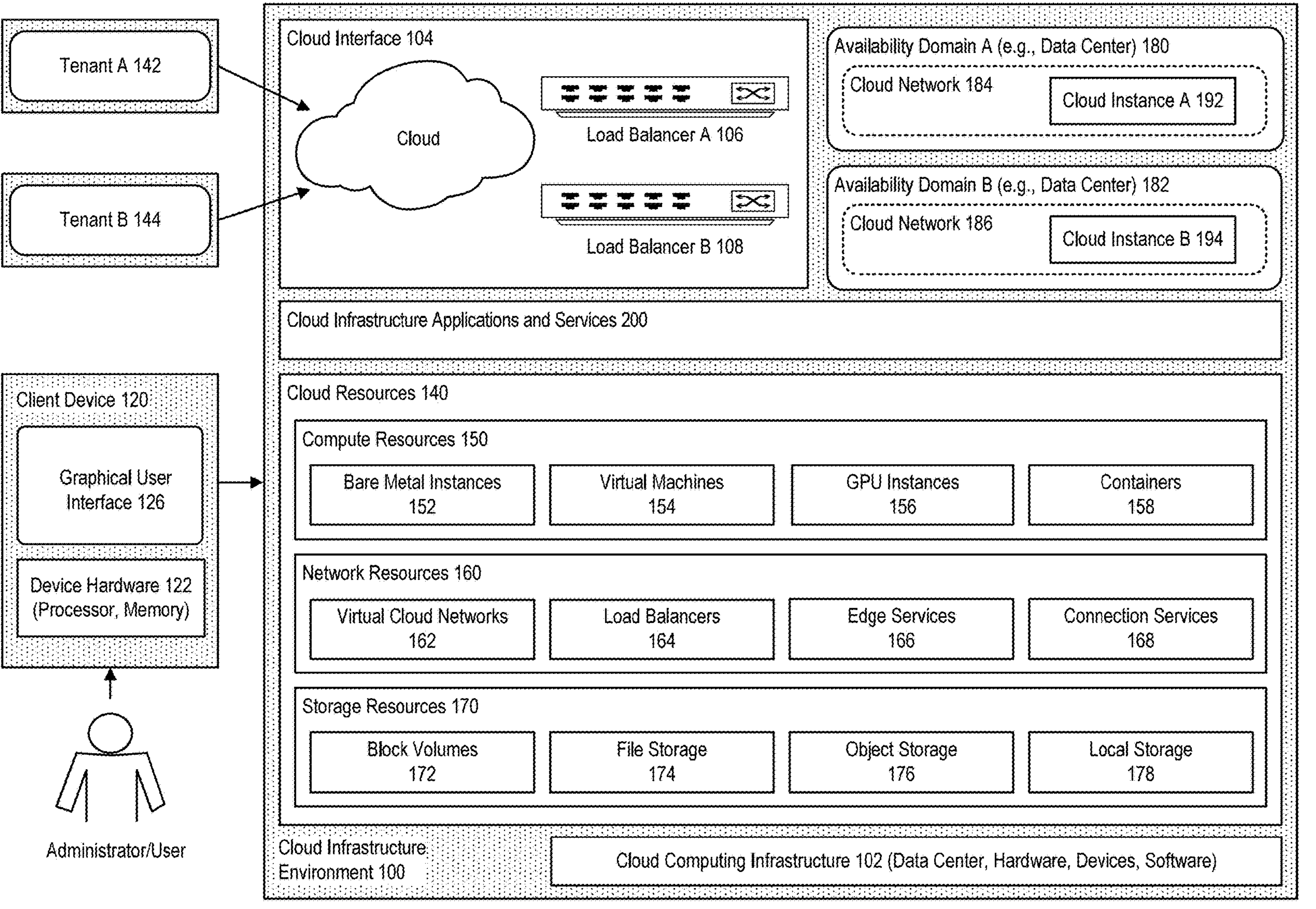
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE CLOUD ENVIRONMENTS
3. SECURITY AND COMPLIANCE VISIBILITY SYSTEM ARCHITECTURE
4. PROVIDING CUSTOMERS VISIBILITY INTO SECURITY AND COMPLIANCE OF SERVICES IN A CUSTOMER CLOUD INFRASTRUCTURE ENVIRONMENT

5. EXAMPLE CUSTOMER-FACING DASHBOARD
6. PRACTICAL APPLICATIONS, ADVANTAGES & IMPROVEMENTS
7. MISCELLANEOUS; EXTENSIONS

1. General Overview

One or more embodiments present information indicating infrastructure security and compliance of services of a customer cloud environment to a customer-facing dashboard. The information presented to the customer-facing dashboard is a subset of information that is available to operators associated with a cloud service provider (CSP), i.e., CSP operators. Initially, a tier-one dashboard service obtains information indicating infrastructure security and compliance of one or more services in the customer cloud infrastructure environment. A tier-two dashboard service obtains the information indicating infrastructure security and compliance from the tier-one dashboard service and filters the infrastructure security information to create a subset of information indicating the security and compliance of the one or more services. The subset of infrastructure security and compliance information is presented to operators associated with a customer of the CSP, i.e., customer operator, on a customer-facing dashboard.

In one or more embodiments, the tier-one dashboard service presents the information indicating infrastructure security and compliance to CSP operators on a CSP-facing dashboard. The CSP-facing dashboard is not accessible by customer operators. The tier-one dashboard obtains the information indicating infrastructure security and compliance of the one or more services by monitoring the services in the customer cloud environment and/or by obtaining logs of the services.

One or more embodiments filter the infrastructure security and compliance information for the one or more services to generate the subset of infrastructure security and compliance information that is presented to the customer operator. The tier-two dashboard service may filter the information by removing proprietary information and/or indicating information from the infrastructure security information.

One or more embodiments select a first compliance regime for a first set of services of the customer cloud infrastructure environment and a second compliance regime for a second set of services of the customer cloud infrastructure environment. On a first customer-facing dashboard, the system presents a first visual representation of a first compliance status of the first set of services according to the first compliance regime. On a second customer-facing dashboard, the system presents a second visual representation of a second compliance status of the second set of services according to the second compliance regime.

One or more embodiments described in this Specification and/or recited in the claims may not be included in this General Overview section.

2. Example Cloud Environments

One or more embodiments provide features associated with cloud environments, including dedicated or private label cloud (PLC) environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premise data center, software application framework, or other information technology infrastructure.

Cloud Infrastructure Environments

Figure 2:
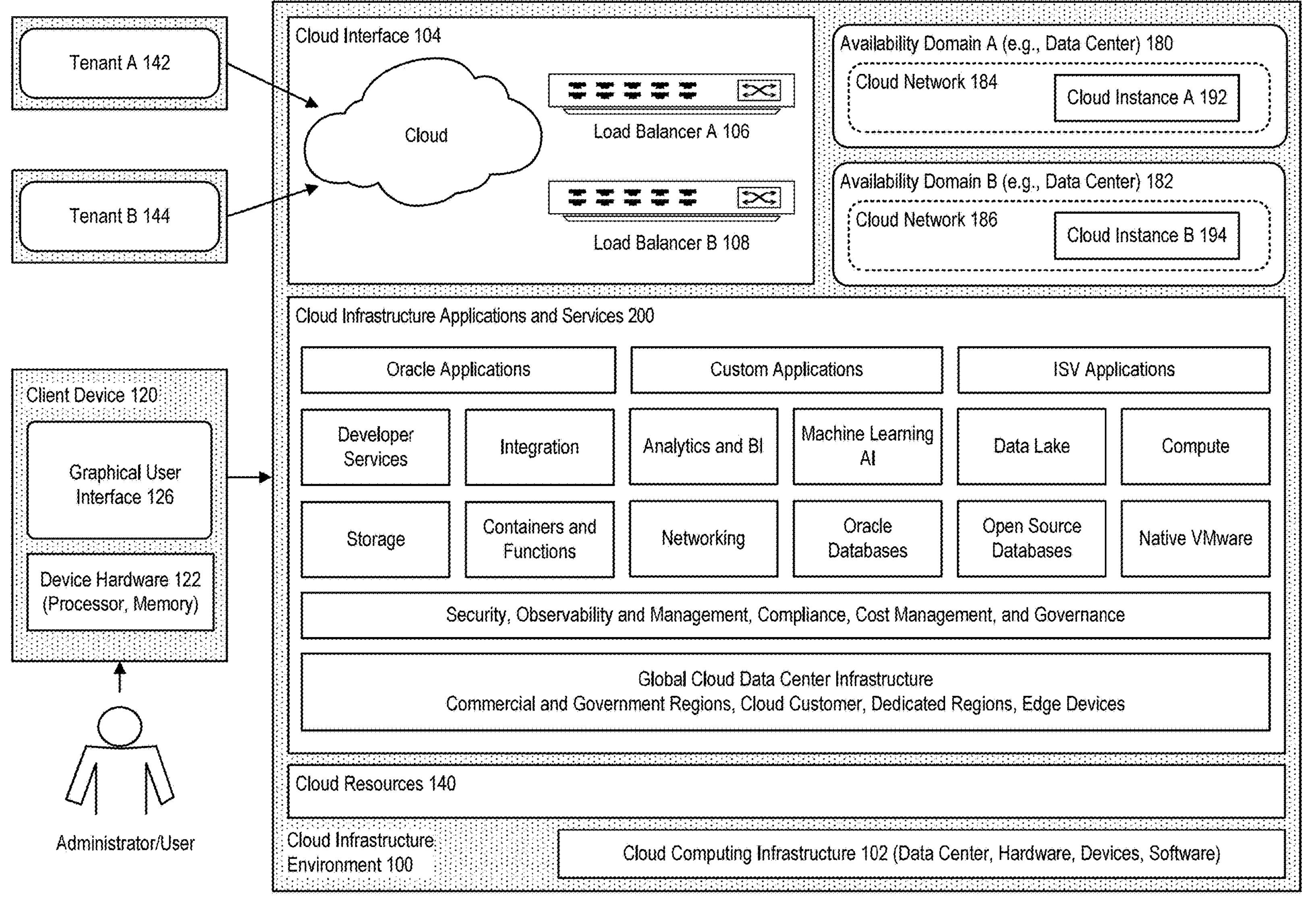
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, cloud instant B 194. In an embodiment, availability domain A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, tenant B 144, that provides a secure and isolated partition within the cloud infrastructure environment where the customer can create, organize, and administer their cloud resources. A cloud tenant/customer a 7 can access an availability domain and a cloud network to access each of their cloud instances. A tenancy is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
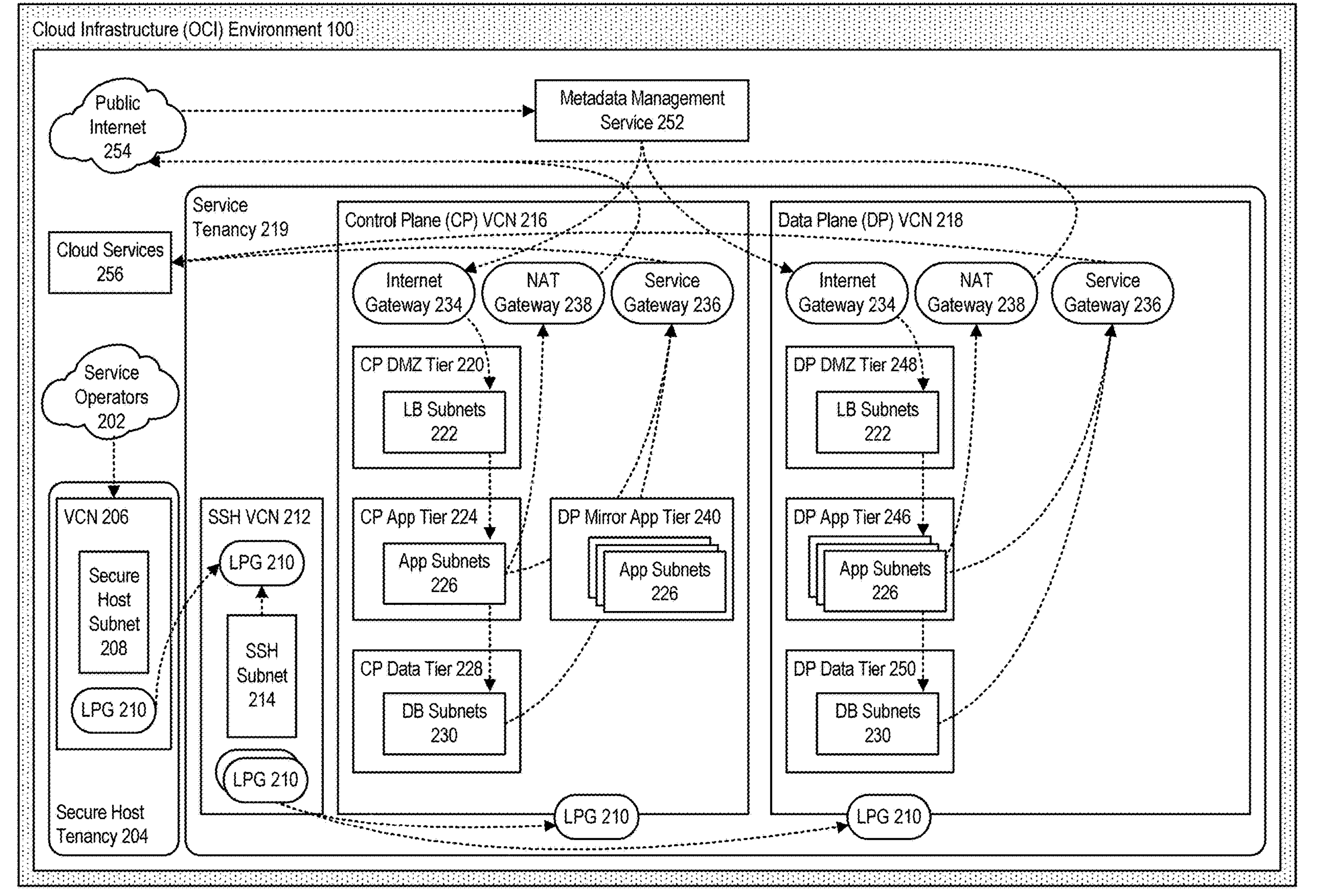
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
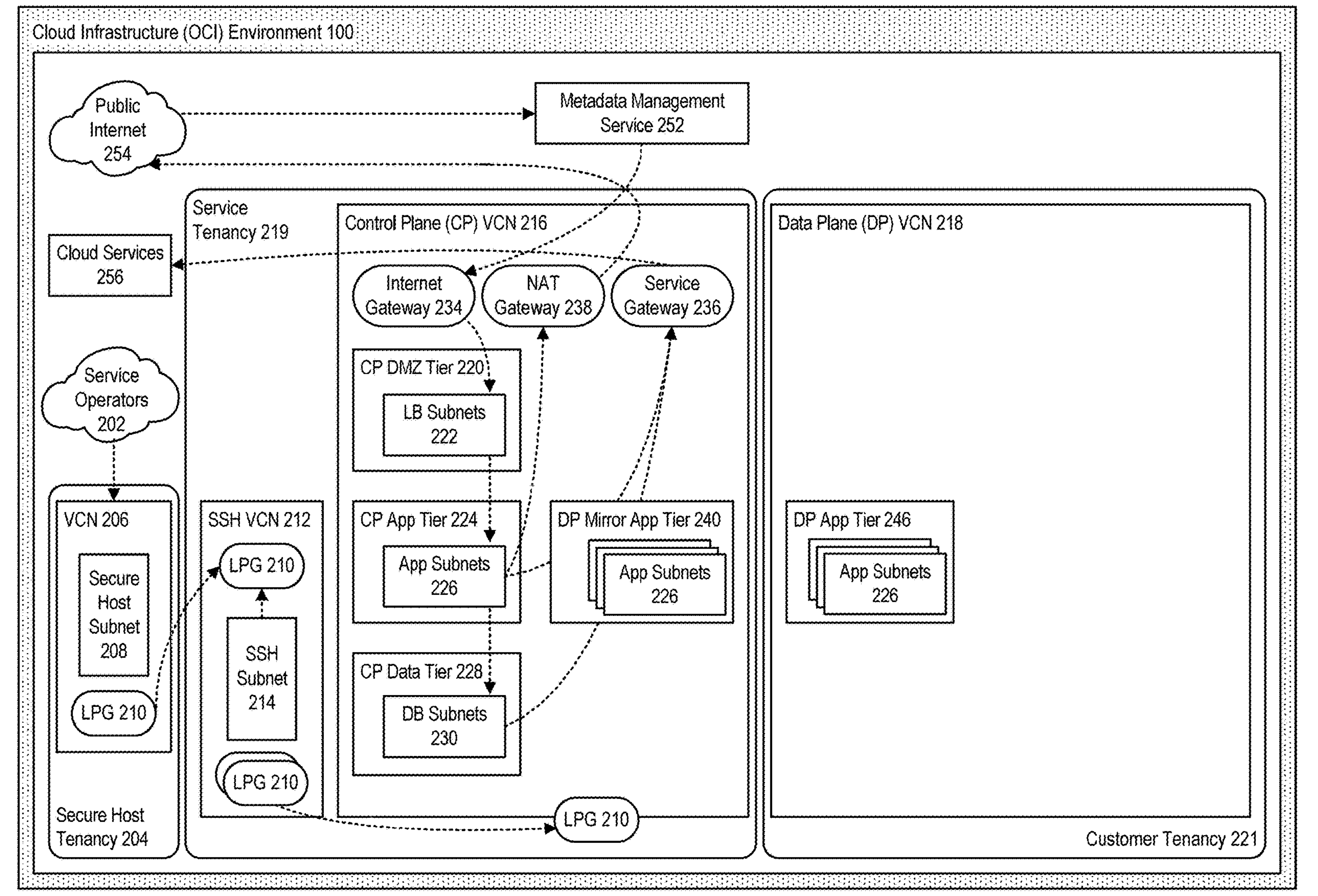
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
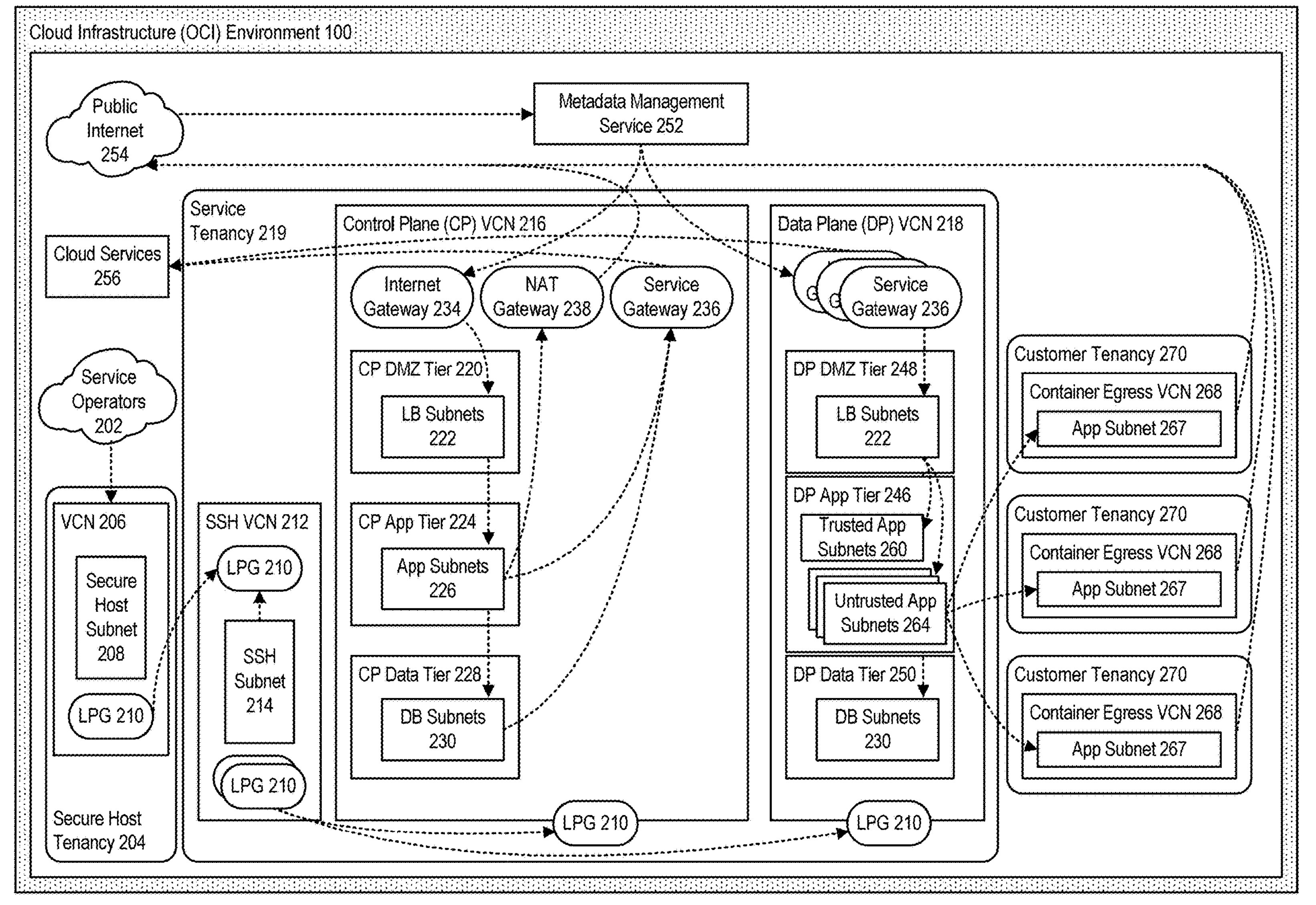
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
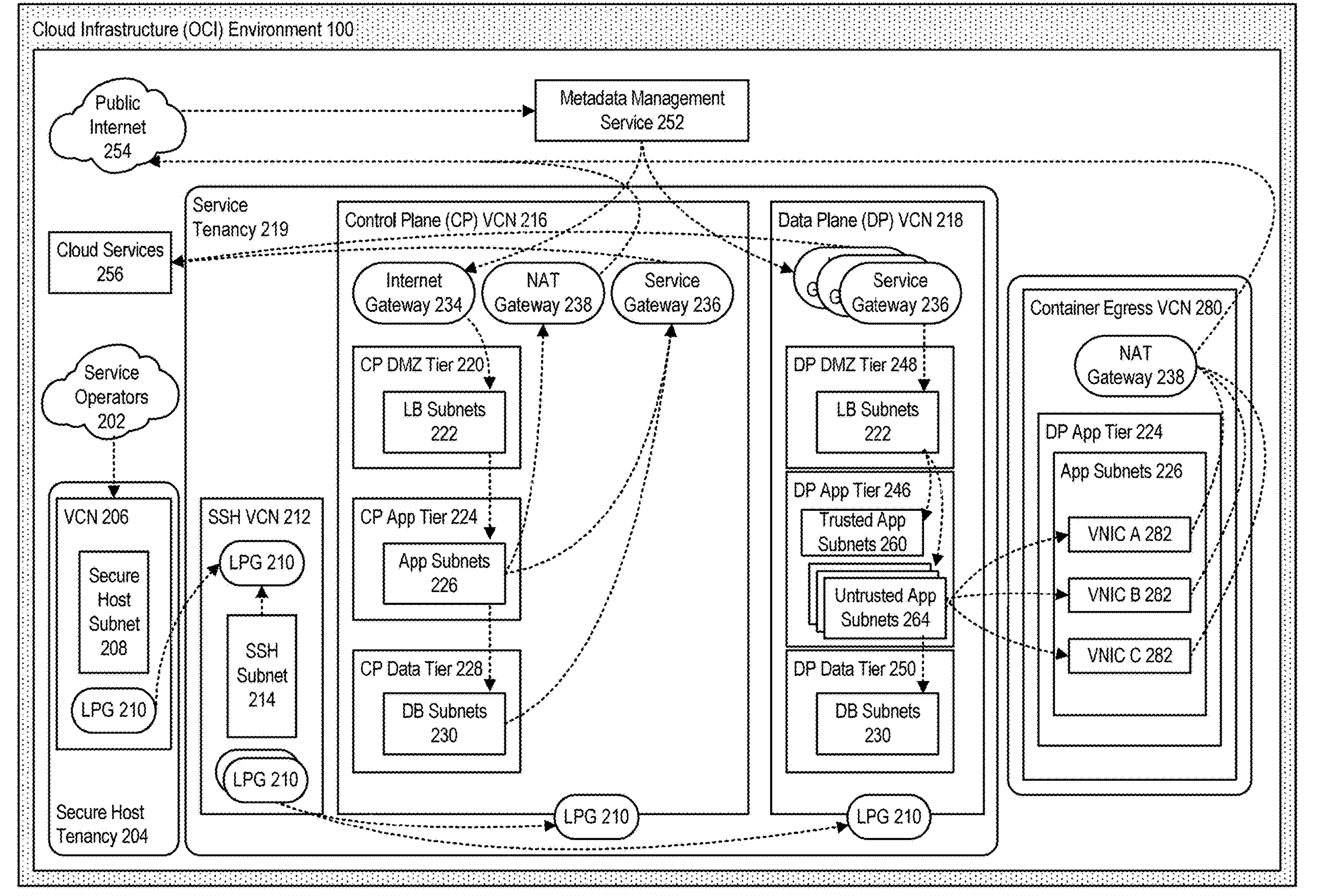
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
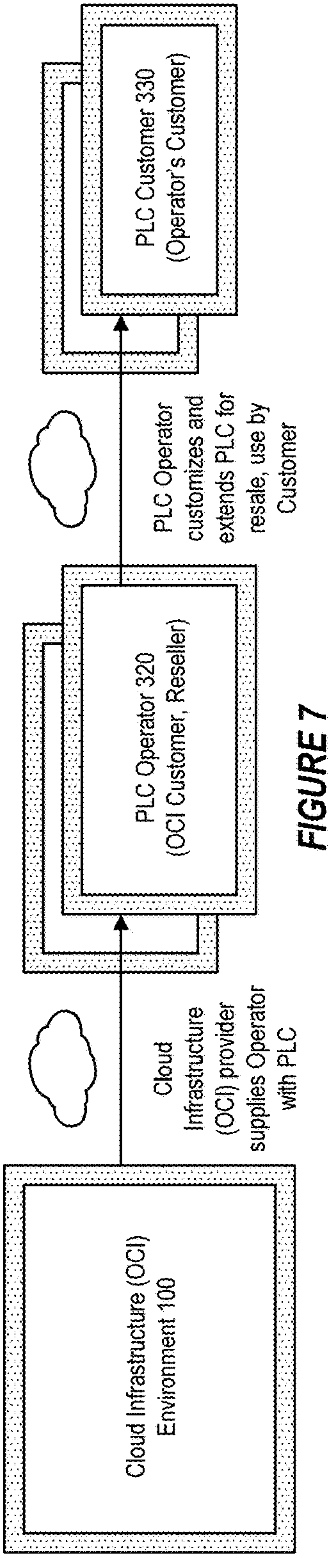
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., Oracle Cloud Infrastructure, OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
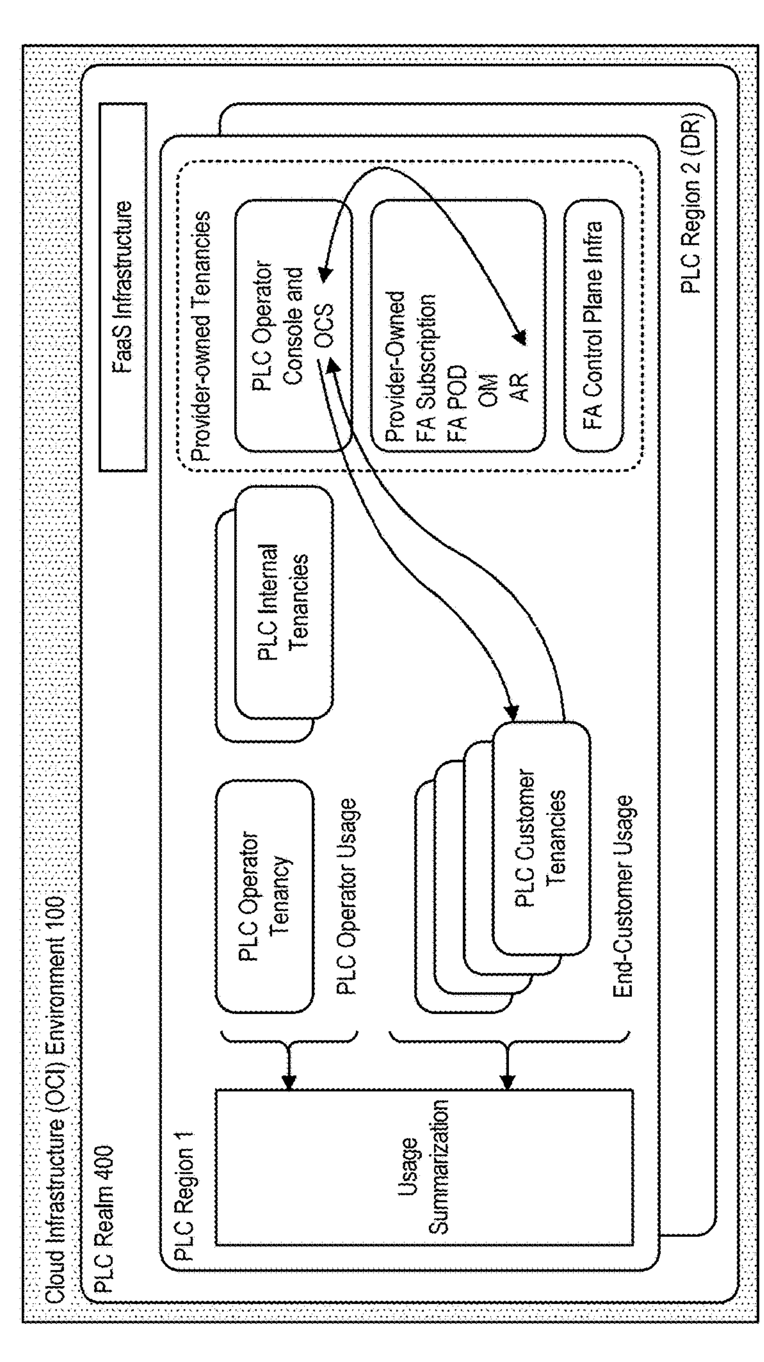
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, referred to herein in some embodiments as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of OCI, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
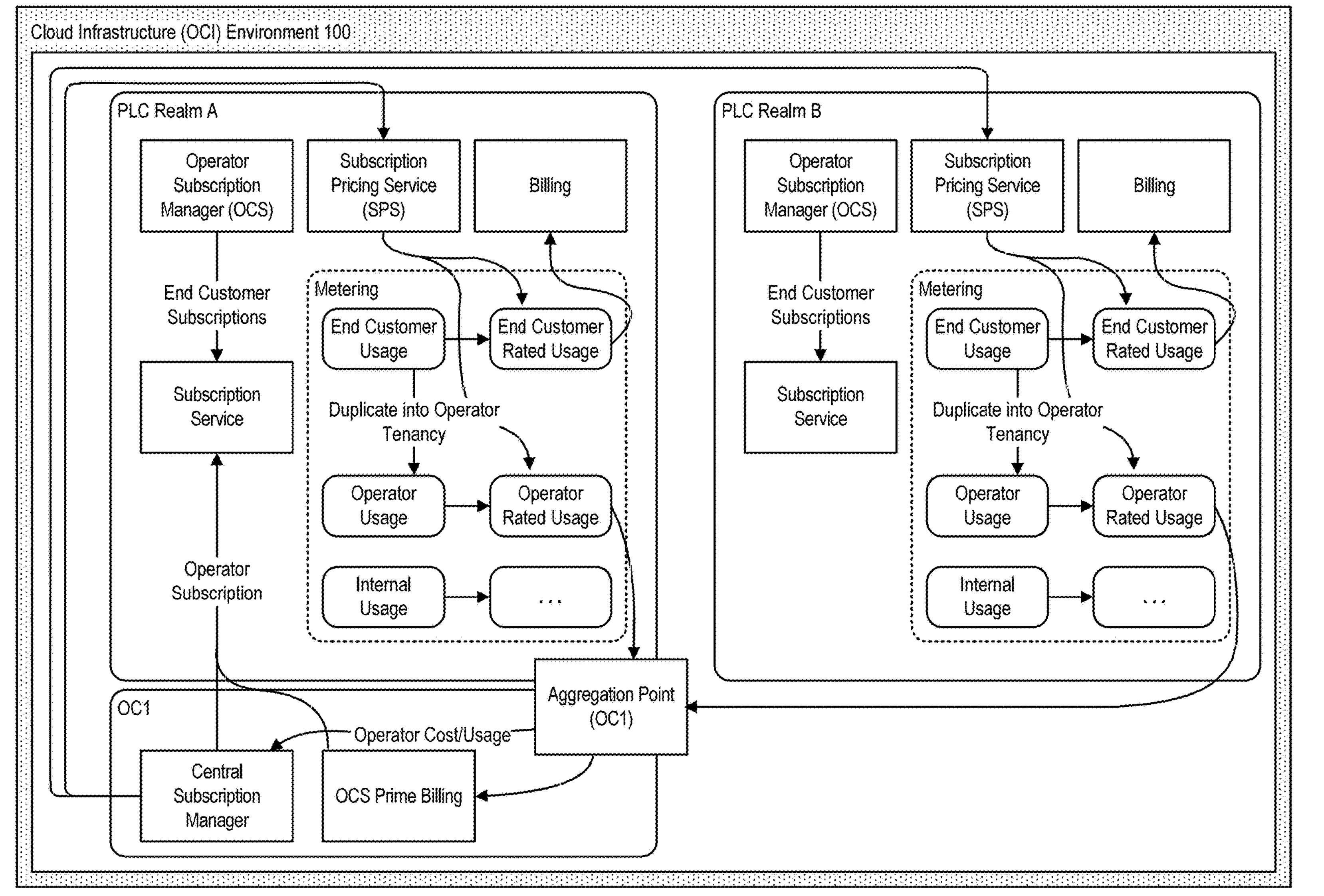
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, an Oracle Cloud Subscriptions (OCS) service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in OCS that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
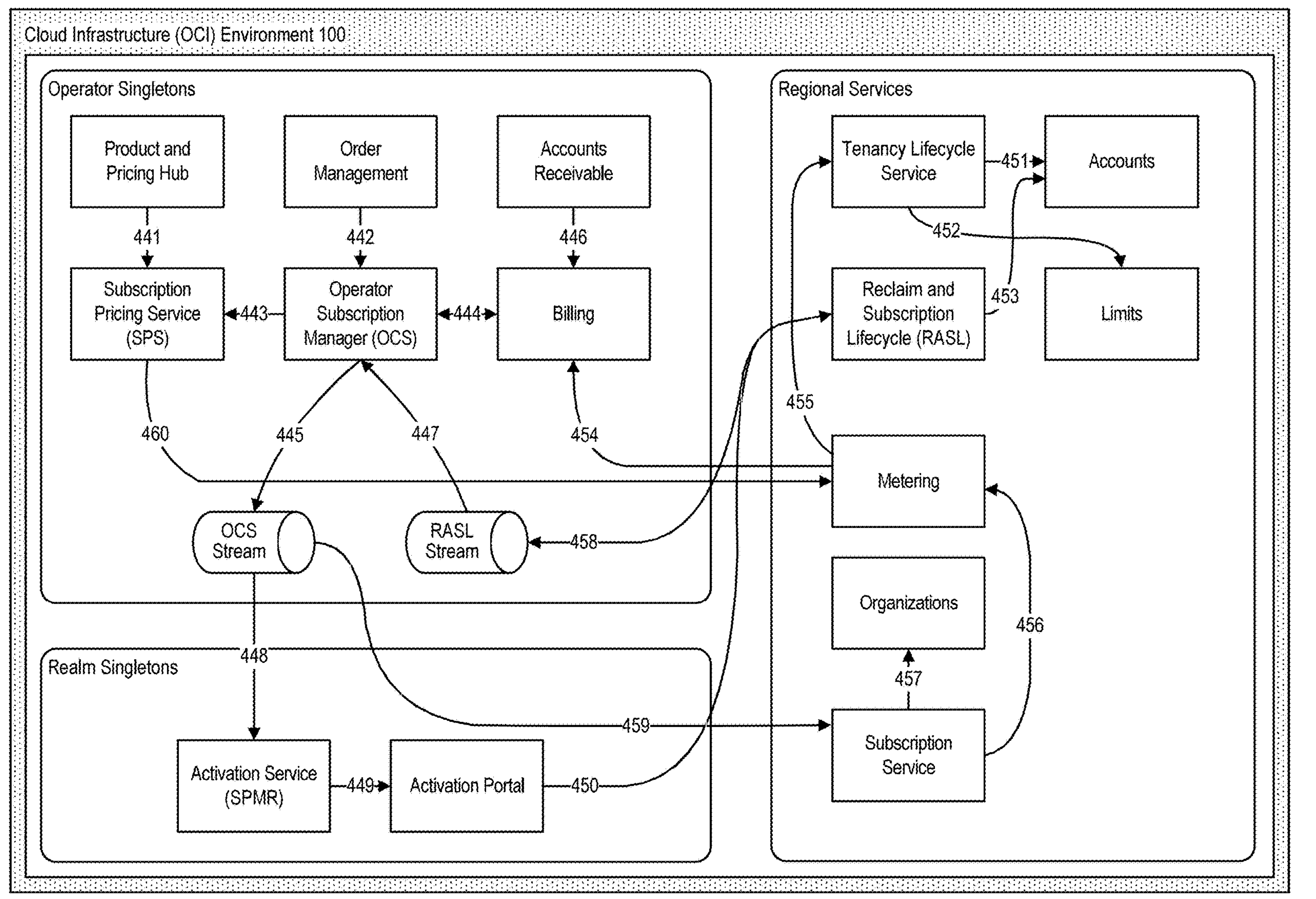
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The OCS service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from an Oracle Fusion Product Hub and a global price list from an Oracle Fusion Pricing Hub.

In accordance with an embodiment, the OCS service operates as an upstream service to receive new order requests, for example, from an Oracle Fusion Order Management environment. The OCS service can provide subscription information to the SPS service. Subscription details like time of quote, configuration, and subscription type (Commitment, PayG) help SPS to determine an effective base price (Rate Card) for the subscription. The OCS service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the OCS component to create subscriptions, rate cards, and billing accounts. At 443, pricing configuration and pricing rules are sent to SPS for new orders. At 444, OCS is used to set up a billing account in the billing service or component. At 445, OCS publishes events to an OCI streaming component. At 446, charge data is sent to an accounts receivable component to generate invoices. At 447, OCS consumes reclaim and subscription lifecycle (RASL) events from OCI streaming. At 448, an activation service reads the OCS event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads OCS event stream. At 459, the subscription service reads OCS event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

3. Security and Compliance Visibility System Architecture

FIG. 11A illustrates a system 1100 in accordance with one or more embodiments. As illustrated in FIG. 11A, system 1100 includes a cloud infrastructure environment 1102, a customer operator interface 1104, and a CSP operator interface 1106. In one or more embodiments, the system 1100 may include more or fewer components than the components illustrated in FIG. 11A. The components illustrated in FIG. 11A may be local to or remote from each other. The components illustrated in FIG. 11A may be implemented in software and/or hardware. Components may be distributed over multiple applications and/or machines. Multiple components may be combined into one application and/or machine. Operations described with respect to one component may instead be performed by another component.

In one or more embodiments, the cloud infrastructure environment 1102 refers to hardware, software, networking, and storage components that enable the delivery of cloud computing services. The cloud infrastructure environment 1102 further includes hardware and/or software configured to perform operations described herein for providing visibility into infrastructure security and compliance of services in the cloud infrastructure environment 1102 to customers of the CSP. Examples of operations for providing customers visibility to infrastructure security and compliance of services in the cloud infrastructure environment 1102 are described below with reference to FIG. 12.

In one or more embodiments, the cloud infrastructure environment 1102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the cloud infrastructure environment 1102 is a cloud computing infrastructure provided by a first entity, e.g., a CSP, to a second entity, e.g., a customer of the CSP. The customer of the CSP provides cloud services to a third entity, e.g., an organization or business. The CSP develops and provides the cloud infrastructure technology that powers the cloud infrastructure environment 1102. Customers of the CSP own and deploy the cloud infrastructure environment 1102. The operators of the CSP, i.e., CSP operators, maintain and update the core functionalities of the cloud infrastructure environment 1102. Operators associated with customers of the CSP, i.e., customer operators, are responsible for managing the cloud infrastructure environment 1102, including providing level 1 and level 2 support. Level 1 support may include the initial point of contact for users or customers of the cloud resources and provide basic troubleshooting and assistance with common issues. Level 2 support may include handling escalated support tickets, conducting in-depth analysis and troubleshooting of technical issues, and performing root cause analysis to identify underlying problems. Level 2 support may further include providing advanced technical guidance and solutions as well as collaborating with higher levels of support or specialized teams for complex issues that require further expertise. Higher levels of support are provided by CSP operators, i.e., operators of the CSP.

In one or more embodiments, CSP operators have access to a wide range of security and compliance information for the services in the cloud infrastructure environment 1102 through a CSP-facing dashboard 1144. This information may include data from scanners, audit trails, ZTB audits, and workload protection from numerous teams across numerous services. The security and compliance information may be structured or unstructured data. Customer operators are provided access to a subset of this security and compliance information through a customer-facing dashboard 1142. As will be described in further detail below, a tier-one dashboard service 1112 obtains and presents the security and compliance information for the services to the CSP-facing dashboard 1144, and a tier-two dashboard service 1118 obtains and presents the subset of security and compliance information to the customer-facing dashboard 1142. Customer operators do not have access to the CSP-facing dashboard 1144.

In one or more embodiments, the infrastructure services 1108 for the cloud infrastructure environment 1102 encompass resources that enable delivery, management, and operation of cloud-based solutions. Infrastructure services 1108 encompass a wide range of services, including (a) compute services, e.g., virtual machines, containers, (b) storage services, e.g., object storage, block storage, (c) networking services, e.g., virtual networks, load balancing, (d) database services, e.g., relational databases, NoSQL Databases, (e) identity and access management, e.g., authentication, authorization, (f) monitoring and logging, e.g., metrics monitoring, logging and auditing, and/or (g) security services, e.g., firewalls, encryption.

In embodiments, the infrastructure services 1108 include an abuse service, a fraud service, security services, and a compliance service. An abuse service or abuse management service addresses and mitigates various forms of abuse or misuse of cloud resources and services. The abuses may include activities such as spamming, phishing, malware distribution, denial-of-service (DoS) attacks, unauthorized access, or any behavior that violates the CSP's terms of service or acceptable use policies. A fraud service or fraud detection service detects, prevents, and mitigates fraudulent activities occurring within the cloud infrastructure environment 1102 or involving cloud-based services. The fraudulent activities may include unauthorized access, data breaches, identity theft, financial fraud, and other forms of malicious behavior aimed at exploiting cloud resources or compromising cloud-based systems. Security services protect cloud-based resources, applications, and data from various security threats and vulnerabilities. The security service may mitigate risks, enforce security policies, and maintain compliance with regulatory requirements. A compliance service ensures adherence to regulatory requirements, industry standards, and internal policies related to data protection, privacy, security, and governance.

In one or more embodiments, the data collectors 1110 are components or software tools that gather various types of data from cloud resources for purposes like monitoring, security analysis, compliance auditing, and performance evaluation. Data collectors 1110 may include data collecting agents, detectors, scanning engines, and scanners. Data collection agents are software components installed on cloud resources or servers that gather security-related data. The data collection agents can collect a wide range of information, including system logs, configuration settings, and specific security events. Detectors are specialized tools and mechanisms used to identify and respond to potential security threats, performance issues, or operational inefficiencies. Scanning engines are tools that analyze the cloud infrastructure environment 1102 to identify vulnerabilities, misconfigurations, and compliance with security best practices.

In one or more embodiments, data collection agents include monitoring agents, log collection agents, and security agents. Monitoring agents are deployed within virtual machines, containers, or cloud services to collect performance metrics and health status information. Monitoring agents monitor CPU usage, memory utilization, disk I/O, network traffic, and other resource metrics to ensure optimal performance and availability of cloud resources. Log collection agents gather logs generated by cloud services, virtual machines, containers, and platform-as-a-service (PaaS) offerings. Log collection agents collect logs related to application events, system activities, security incidents, API calls, and configuration changes within the cloud infrastructure environment. Security agents collect security-related data and events from various cloud services and resources. Security agents monitor for security threats, vulnerabilities, and compliance violations within the cloud environment. Security agents may collect data, such as firewall logs, intrusion detection alerts, access control events, encryption status, and identity and access management (IAM) activities.

In one or more embodiments, the data collection agents further include configuration management agents, performance monitoring agents, and compliance and governance agents. Configuration management agents gather data about the configuration settings and resource provisioning within the cloud environment. Configuration management agents collect information about virtual machine configurations, network configurations, storage configurations, access controls, and compliance settings. Performance monitoring agents collect data about application performance, response times, latency, and user experience within the cloud environment. Performance monitoring agents monitor application dependencies, database performance, API performance, and transactional throughput. Compliance and governance agents collect data related to compliance requirements, regulatory standards, and governance policies within the cloud environment. Compliance and governance agents monitor for compliance violations, security risks, and policy deviations.

In one or more embodiments, the tier-one dashboard service 1112 is a tool or platform that provides CSP operators an interface for monitoring and managing various components of the cloud infrastructure environment 1102. The tier-one dashboard service 1112 provides real-time visibility into the performance, availability, security, and compliance of infrastructure resources, such as servers, networks, databases, applications, and cloud services. The tier-one dashboard service 1112 may be associated with one or more of the infrastructure services 1108. The cloud infrastructure environment 1102 may include multiple tier-one dashboard services.

In one or more embodiments, the tier-one dashboard service 1112 displays, on a CSP-facing dashboard 1144, real-time data, and metrics related to the health and performance of one or more infrastructure services 1108 of the cloud infrastructure environment 1102. The data and metrics may include CPU usage, memory utilization, disk I/O, network traffic, and application performance metrics. The tier-one dashboard service 1112 may include alerting and notification mechanisms that notify administrators and operators about critical events, performance issues, security incidents, and compliance violations. Alerts can be configured based on predefined thresholds and conditions. The tier-one dashboard service 1112 may generate charts, graphs, tables, and other visualizations to represent data and metrics in the CSP-facing dashboard 1144 in a meaningful and intuitive way.

In one or more embodiments, the tier-one dashboard service 1112 is configurable to cause display of relevant information and metrics based on specific requirements and/or operator preferences. The tier-one dashboard service 1112 may create custom dashboards for different services, projects, or use cases. The tier-one dashboard service 1112 may integrate with one or more of the data collection agents for the infrastructure data. The tier-one dashboard service 1112 may also include monitoring tools and logging systems for collecting data.

In one or more embodiments, the application programming interfaces (API) 1114 are sets of rules, protocols, and tools that enable different services and software applications to communicate with each other. APIs 1114 define the methods and data formats that applications use to request and exchange information, perform actions, and access services provided by other software components, systems, or platforms. APIs 1114 serve as intermediaries that facilitate interoperability and integration between disparate software systems, enabling them to work together seamlessly.

In embodiments, the APIs 1114 define interfaces or endpoints through which services interact with each other. The interfaces specify the methods, parameters, and data formats that are supported for communication. APIs 1114 may use standardized protocols for communication, such as HTTP (Hypertext Transfer Protocol) or HTTPS (HTTP Secure), to ensure interoperability between different systems regardless of the underlying technologies. API interactions may follow a request-response model, where one service, e.g., the tier-two dashboard service 1118, sends a request to another service, e.g., the tier-one dashboard service 1112, using the API. In response to receiving the request, the tier-one dashboard service 1112 processes the request and returns a response to the tier-two dashboard service 1118 containing the requested data or performing the requested action.

In embodiments, the APIs 1114 use HTTP methods (GET, POST, PUT, DELETE, etc.) to define the type of operation being performed. For example, a GET request is used to retrieve data, while a POST request is used to submit data to be processed. Each API endpoint is identified by a unique URL (Uniform Resource Locator) or URI (Uniform Resource Identifier) that corresponds to a specific resource or action provided by the API. Clients access these endpoints to interact with the API. API requests may include parameters passed in the request URL, request headers, or request body, depending on the API's design. These parameters provide additional information or context for the request, such as search criteria, authentication tokens, or data to be processed.

In one or more embodiments, permissions services 1116 are systems and components responsible for managing access control and permissions for operators, applications, and resources in the cloud infrastructure environment 1102. The permissions services 1116 ensure that authorized users or entities have the appropriate level of access to cloud resources, data, and functionalities. The permissions service 1116 may include identity and access management (IAM), access control lists (ACLs), key management services (KMS), API authorization and authentication, and network security groups (NSGs).

In embodiments, IAM services manage user identities, access rights, and permissions for accessing cloud services and resources. IAM services include various features, such as user authentication, authorization, user provisioning and deprovisioning, role-based access control, multi-factor authentication, and centralized policy management. IAM services allow organizations to define and enforce fine-grained access controls based on roles, groups, or individual users, ensuring that access to specific resources or ability to perform certain actions is restricted to authorized users.

In embodiments, ACLs are used to define and enforce access control policies at the resource level, such as storage buckets, virtual machines, or databases. ACLs specify the users or entities that are granted access to a particular resource and what actions the users or entities are allowed to perform (e.g., read, write, execute). KMS services manage cryptographic keys used for encrypting and decrypting data in cloud environments. KMS services control access to encryption keys through access policies, allowing organizations to define who can manage and use encryption keys to protect sensitive data.

In embodiments, APIs provide programmatic access to resources and functionalities. API authorization and authentication services manage access to these APIs, ensuring that interactions with cloud resources through APIs are restricted to authorized applications or services. API authorization and authentication services may use standards, such as OAuth 2.0 or JSON Web Tokens, to secure API access. NSGs are used to define and enforce network-level access controls within a cloud environment. NSGs specify rules that control inbound and outbound traffic to and from cloud resources based on source and destination IP addresses, ports, and protocols.

In one or more embodiments, the tier-two dashboard service 1118 is a tool or platform that provides customer operators an interface for monitoring and managing various components of the infrastructure services 1108 of the cloud infrastructure environment 1102. The tier-two dashboard service 1118 provides real-time visibility into the performance, availability, security, and compliance of infrastructure resources, such as servers, networks, databases, applications, and cloud services through a customer-facing dashboard 1142. The tier-two dashboard service 1118 provides a subset of the security and compliance information that is available to CSP providers. The tier-two dashboard service 1118 may include one or more components for filtering, sorting, or otherwise organizing the security and compliance information collected by the data collectors 1110. For example, the tier-two dashboard service 1118 may include a configuration manager 1122, a privacy filtering engine 1124, a security insight engine 1126, and a universal compliance engine 1128 for generating the subset of security and compliance information associated with the infrastructure services 1108 for presenting to the customer-facing dashboard 1142.

In one or more embodiments, the configuration manager 1122 of the tier-two dashboard service 1118 manages and controls dashboard settings, user preferences, data sources, and the visual presentation of data. The configuration manager 1122 performs various functions, including customization and personalization, data integration and management, customer operator access and security controls, configuration templates, performance optimization, compliance, and regulatory adherence. The configuration manager may allow customer operators to personalize their dashboard experience, including setting up widgets, defining the metrics that are important, choosing visual representations (graphs, charts, etc.), and configuring notifications and alerts. The configuration manager may ensure seamless integration of different data sources into the dashboard. This may involve configuring APIs, setting up data feeds, and ensuring that data refresh rates are optimal to maintain up-to-date information without overloading the data sources. The configuration manager 1122 may manage customer operator roles and permissions to ensure that customer operator access is restricted to the appropriate data and features. Managing roles and permissions may include implementing authentication mechanisms and integrating with existing identity management systems to enforce security and compliance policies.

In embodiments, the configuration manager 1122 monitors and optimizes the performance of the tier-two dashboard service 1118 to ensure the service runs efficiently across devices and networks. This includes managing how data is cached, how queries are executed, and how results are rendered. The configuration manager 1122 may ensure that the dashboard complies with data governance and privacy laws; this is particularly important when dealing with sensitive or personal data. Configuration settings allow data to be displayed in a manner that adheres to regional and international compliance standards. The configuration manager 1122 may provide templates or predefined configurations that help new customer operators quickly set up dashboards relevant to their needs. Templates can be based on job roles, departmental needs, or industry-specific metrics.

In one or more embodiments, the privacy filtering engine 1124 masks or redacts sensitive information, e.g., personal identifying information (PII) and proprietary information, within security and compliance reports, logs, and dashboards. Masking and redacting involves replacing sensitive data with placeholder values or obscuring information to prevent unauthorized access or exposure. For example, PII, such as names, email addresses, and identification numbers, can be masked in security logs or compliance reports. Tokenization involves replacing sensitive data with randomly generated tokens or surrogate values. Tokenization preserves the format and length of the original data while protecting confidentiality. Cloud infrastructure security and compliance information can be tokenized to conceal PII and proprietary data while still allowing for analysis and monitoring. Dynamic data masking techniques dynamically obscure sensitive information based on user access permissions and roles. Dynamic data masking ensures that viewing the complete data is restricted to authorized users, while others see masked or redacted versions. Dynamic data masking can be applied to security and compliance information to restrict access to sensitive data based on user privileges. Privacy filtering engine 1124 allows the CSP to selectively disclose non-sensitive information while concealing PII and proprietary data. This ensures that relevant security and compliance information is still available for analysis and reporting without exposing sensitive data to unauthorized parties.

In one or more embodiments, the privacy filtering engine 1124 includes a feature detection component that uses machine learning models trained with policies that define feature detection rules for identifying and filtering sensitive information. These policies specify criteria for recognizing PII and proprietary data within security and compliance information, enabling automated filtering and redaction based on predefined conditions and thresholds. This allows for real-time or near real-time filtering of PII and proprietary information.

In one or more embodiments, the security insight engine 1126 analyzes the security and compliance information for the infrastructure services 1108 provided by the data collectors 1110 and identifies potential security breaches or threats, i.e., insights. More particularly, the security insight engine 1126 includes a first component that understands the logs using semantic analysis to analyze the security and compliance information, e.g., audit logs, provided to the tier-two dashboard service 1118. A second component of the security insight engine 1126 correlates actions or tactics across one or more of the infrastructure services 1108 to identify patterns. A third component of the security insight engine 1126 identifies security breaches and potential threats that correspond to the identified patterns. The security insight engine 1126 may present an alert to operators when a threat is detected. The security insight engine 1126 may determine a probability of a threat and alert operators when the threat probability is above a threshold.

In embodiments, the security insight engine 1126 uses machine learning models trained with policies that define rules for semantically analyzing security and compliance information, correlating actions across services, and identifying security breaches and threats. These policies specify criteria for recognizing security breaches and threats within security and compliance information, enabling automated alerting of customer operators based on predefined conditions and thresholds.

In one or more embodiments, the universal compliance engine 1128 determines compliance of the infrastructure services 1108 in the cloud infrastructure environment 1102 to one or more compliance regimes 1140. A cloud infrastructure environment and/or customer of the cloud infrastructure environment may be subject to one or more compliance regimes 1140. A customer operator may select one or more compliance regimes to determine compliance of one or more of the infrastructure services 1108. The universal compliance engine 1128 may provide details about compliance to a first customer for a first compliance regime and details about compliance to a second customer for a second compliance regime.

In embodiments, the universal compliance engine 1128 uses machine learning models trained with policies that define rules for the compliance regimes 1140. These policies specify criteria for identifying the infrastructure services associated with the compliance regimes and information necessary to determine a level of compliance of the infrastructure services.

In one or more embodiments, the compliance rules for use by the universal compliance engine 1128 are defined in a matrix. The rows of the matrix correspond to different compliance regimes, and the columns correspond to the types of security controls for the respective compliance regimes.

In one or more embodiments, a data repository 1120 is any type of storage unit and/or device (e.g., a file system, database, collection of tables, or any other storage mechanism) for storing data. Further, a data repository 1120 may include multiple different storage units and/or devices. The multiple different storage units and/or devices may or may not be of the same type or located at the same physical site. Further, a data repository 104 may be implemented or executed on the same computing system as the cloud infrastructure environment 1102. Additionally, or alternatively, a data repository 104 may be implemented or executed on a computing system separate from the cloud infrastructure environment 1102. The data repository 104 may be communicatively coupled to the cloud infrastructure environment 1102 via a direct connection or via a network.

Information describing providing customer visibility into security and compliance information of services in the cloud infrastructure environment 1102 may be implemented across any of components within the system 1100. However, this information is illustrated within the data repository 1120 for purposes of clarity and explanation.

In one or more embodiments, configuration information 1132 includes information associated with dashboard layout and user interfaces. The dashboard may have preset or standard layouts selectable by customer operators. Alternatively, the layout of the dashboard may be customizable by the operator. This may include customizable widgets or sections that operators may tailor to display the information most relevant to the customer. For example, a customer operator may customize various features including UI configuration, data visualization options, alters and notifications, and user management setting.

In one or more embodiments, configuration information 1132 includes operator selections for customizing the layout and visual elements of the dashboard according to their preferences or operational needs. Configuration information 1132 may include options to adjust the dashboard for various accessibility needs, including font size, color contrast, and support for screen readers. The configuration information may include customer operator selections for different types of data visualizations, such as line charts, bar graphs, pie charts, and maps based on the type of data displayed. Configuration information may include configuration settings for enabling or disabling real-time data updates. Configuration information may include operator selections that define how data should be aggregated and what filters can be applied to focus on specific data subsets. Configuration information may include operator selection of custom alerts based on identified thresholds or events. Configuration information may include operator preferences for how and when notifications are received.

In one or more embodiments, the permissions database 1130 is a centralized repository for permissions, access controls, and authorization settings for various resources within the cloud infrastructure environment 1102. The permissions database 1130 may be utilized by the permissions service 1116 to enforce security policies, manage user access, and ensure compliance with regulatory requirements. The permissions database 1130 may store information about users, groups, roles, and their associated permissions for accessing specific resources or performing certain actions. Permissions information may include various details, such as user identities, resource identifiers, permissions granted (e.g., read, write, delete), and any conditions or restrictions associated with the permissions. The database provides a centralized location for managing access controls and authorization policies across the cloud infrastructure environment 1102.

In one or more embodiments, machine learning algorithms 1134 are algorithms that can be iterated to train a target model f that best maps a set of input variables to an output variable. In particular, machine learning algorithms 1134 are configured to generate and/or train models used by the privacy filtering engine 1124, the security insight engine 1126, and the universal compliance engine 1128.

A machine learning algorithm is an algorithm that can be iterated to train a target model f that best maps a set of input variables to an output variable using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

A machine learning algorithm 1134 generates a target model f such that the target model f best fits the datasets of training data to the labels of the training data. Additionally, or alternatively, a machine learning algorithm 1134 generates a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, privacy rules 1136 are a framework that aligns data usage with privacy standards by clearly outlining the data elements, their privacy classifications, intended use, and applicable controls. The privacy rules 1136 may be provided in a table or other structured format.

In one or more embodiments, the security rules 1138 for use by the security insight engine 1126 are defined in a matrix. The rows of the matrix correspond to different services, and the columns correspond to different types of attacks. The security rules 1138 may be associated with the identification of unusual access patterns, vulnerability trends, changes in network traffic, failed login attempts, compliance deviations, anomalies in user behavior, software and hardware inventory anomalies, and security misconfigurations.

In one or more embodiments, compliance regimes 1140 include set of laws, regulations, standards, and best practices that govern how data and infrastructure in the cloud need to be managed to ensure data protection, privacy, and security. Compliance regimes 1140 vary depending on the industry, the type of data handled, and the geographic locations of both the CSP and customers of the CSP.

Examples of compliance regimes affecting cloud infrastructure environments based on region include the following: in the United States, Health Insurance Portability and Accountability Act (HIPAA), Federal Information Security Management Act (FISM), Federal Risk and Authorization Management Program (FedRAMP), Open Security Controls Assessment Language (OSCAL), and Children's Online Privacy Protection Act (COPPA); in the European Union, General Data Protection Regulation (GDPR); in the United Kingdom, UK General Data Protection Regulation (UK GDPR), and Data Protection Act (DPA) 2018; in Canada, Personal Information Protection and Electronic Documents Ac (PIPEDA); in the Asia-Pacific region, Personal Data Protection Act (PDPA) and Act on the Protection of Personal Information (APPI); and in Australia, Privacy Act 1988 (including the Australian Privacy Principles). HIPAA applies to healthcare providers, payers, and their business associates. HIPPA sets standards for the protection of sensitive patient data. FISMA governs the security of information systems used by U.S. federal agencies, emphasizing the importance of information security management. FedRAMP provides a standardized approach to security assessment, authorization, and continuous monitoring for cloud products and services used by U.S. federal agencies. OSCAL is a set of formats developed by the National Institute of Standards and Technology to standardize the representation, implementation, and assessment of security controls and compliance in information systems and environments including cloud infrastructures. OSCAL provides a framework for describing system security controls, security implementation details, and the results of security assessments in a structured, machine-readable format. COPPA imposes certain requirements on operators of websites or online services serving children under 13 years of age and on operators of other websites or online services that have actual knowledge that they are collecting personal information online from a child under 13 years of age. GDPR is a regulation that requires businesses to protect the personal data and privacy of EU citizens for transactions that occur within EU member states. It also regulates the exportation of personal data outside the EU and European Economic areas. Post-Brexit, the UK has its version of GDPR, which closely mirrors the EU GDPR but applies specifically to data protection in the UK. DPA 2018 supplements the UK GDPR, setting out exemptions and additional data protection rules specific to the UK. PIPEDA governs how private sector organizations collect, use, and disclose personal information in the course of commercial business. Countries like Singapore and Thailand have their own versions of PDPA designed to protect individuals' personal data and ensure organizations comply with data protection requirements. APPI, Japan's data protection legislation, regulates the use of personal information. Privacy Act 1988 regulates the handling of personal information by businesses and government agencies in Australia.

Examples of compliance regimes affecting cloud infrastructure environments based on global and industry-specific standards include ISO/IEC 27001 and Payment Card Industry Data Security Standard (PCI DSS). ISO/IEC 27001 is an international standard on how to manage information security. PCI DSS is mandatory compliance for entities that store, process, or transmit cardholder data.

In one or more embodiments, customer operator interface 1104 refers to hardware and/or software configured to facilitate communications between a customer operator and the cloud infrastructure environment 1102. Customer operator interface 1104 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of customer operator interface 1104 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, customer operator interface 1104 is specified in one or more other languages, such as Java, C, or C++.

In one or more embodiments, the customer operator interface 1104 includes a customer-facing dashboard 1142. The customer-facing dashboard 1142 includes widgets 1142 for providing visibility into security and compliance information for the infrastructure services 1108 of the cloud infrastructure environment 1102 to the customer operators. The widgets 1144 are standalone applications or components that display content or provide a specific function on the customer-facing dashboard 1142. The widgets 1144 are interactive and used to enhance the customer operator experience by providing quick access to frequently used functions or critical information. The widgets 1144 provide real-time insights, alerts, and analytics about the security posture and compliance status of the cloud infrastructure environment 1102. The widgets 1144 may correspond to individual infrastructure services.

In one or more embodiments, CSP operator interface 1106 refers to hardware and/or software configured to facilitate communications between a CSP operator and the cloud infrastructure environment 1102. CSP operator interface 1106 renders user interface elements on a CSP-facing dashboard 1146 and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of CSP operator interface 1106 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, CSP operator interface 1106 is specified in one or more other languages, such as Java, C, or C++.

Figure 11B:
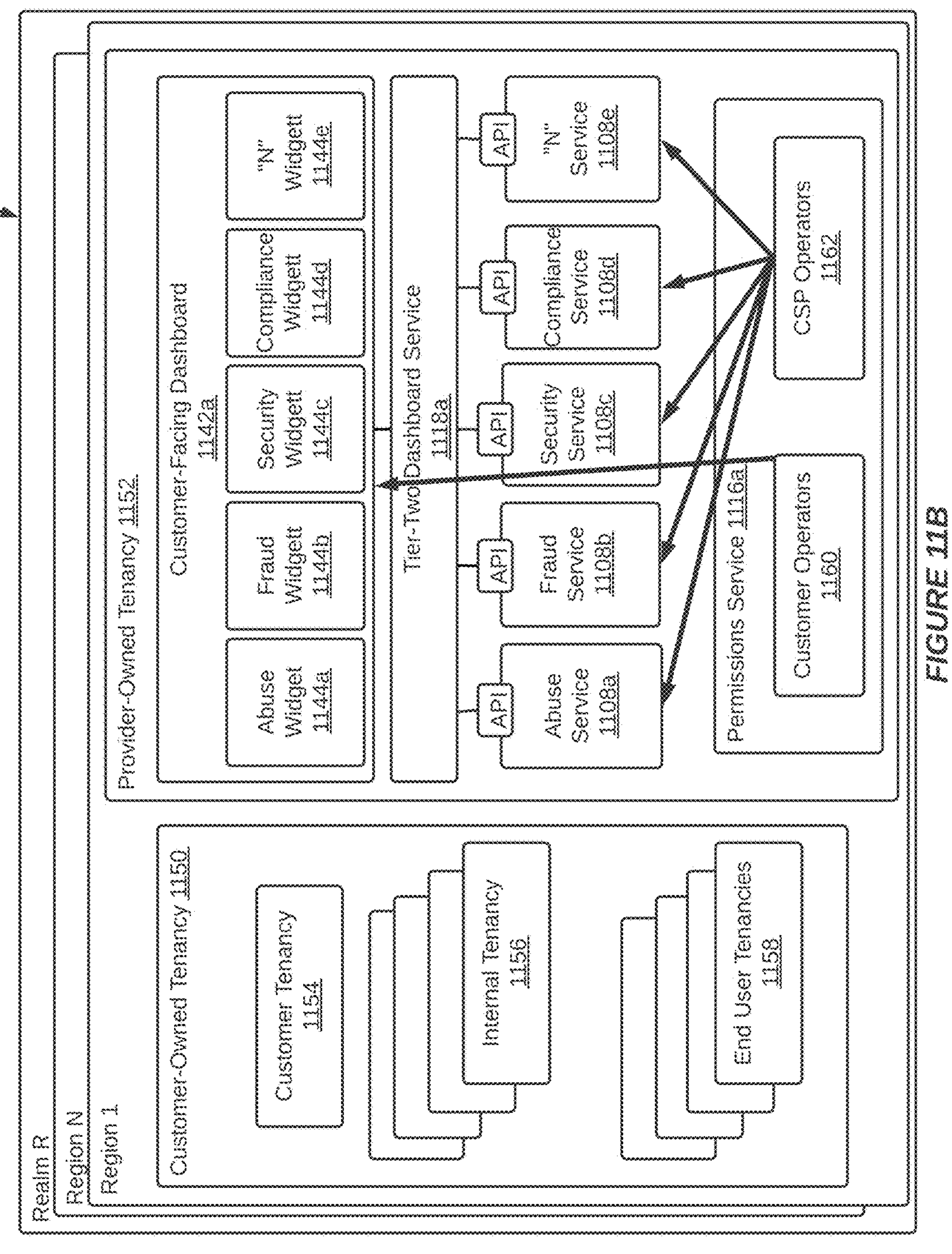

FIG. 11B illustrates a cloud infrastructure environment 1102*a* in accordance with one or more embodiments. As illustrated in FIG. 11B, the cloud infrastructure environment 1102 includes a realm, Realm R, comprising a first region, Region 1, and one or more additional regions, Region N. Cloud regions are isolated from each other. A realm is a logical collection of one or more cloud regions. Realms are accessed separately. Customers of a region are unable to traverse realm boundaries to a region outside that realm.

As illustrated, Region 1 includes a customer-owned tenancy 1150 and a provider-owned tenancy 1152. The customer-owned tenancy 1150 may include a customer tenancy 1154, one or more internal tenancies 1156, and one or more end user tenancies 1158. The customer-owned tenancy 1150 refers to tenancies owned by customers of the CSP, and the end user tenancies 1158 refer to tenancies owned by end users or clients of the customers of the CSP.

The provider-owned tenancy 1152 may include a permissions service 1116*a*, infrastructure services, a tier-two dashboard service 1118*a*, and a customer facing dashboard 1142*a*. The permissions service 1116*a* provides access for customer operators 1160 and CSP operators 1162 to the various components in the cloud infrastructure environment 1102*a*. As indicated by the arrows emanating from the permissions service 1116*a*, CSP operators 1162 can access one or more of the infrastructure services. The infrastructure services include an abuse service 1108*a*, a fraud service 1108*b*, a security service 1108*c*, a compliance service 1108*d*, and "N" service 1108*e*. Customer operators 1162 can access the customer-facing dashboard 1142*a*.

The infrastructure services 1108*a*-1108*e* communicate with the tier-two dashboard service 1118*a* through APIs. The infrastructure services may include one or more APIs for communicating with the tier-two dashboard service 1118*a*. Although not shown, the infrastructure services may include one or more tier-one dashboard services and one or more CSP-facing dashboards.

The tier-two dashboard service 1118*a* communicates with the customer-facing dashboard 1142*a* to provide security and compliance information for the infrastructure services to the various widgets of the customer-facing dashboard 1142*a*. The widgets may include an abuse widget 1144*a*, a fraud widget 1144*b*, a security widget 1144*c*, a compliance widget 1144*d*, and "N" widget 1144*e*. The widgets on the customer-facing dashboard 1142*a* may correspond to the respective infrastructure services.

Figure 12:
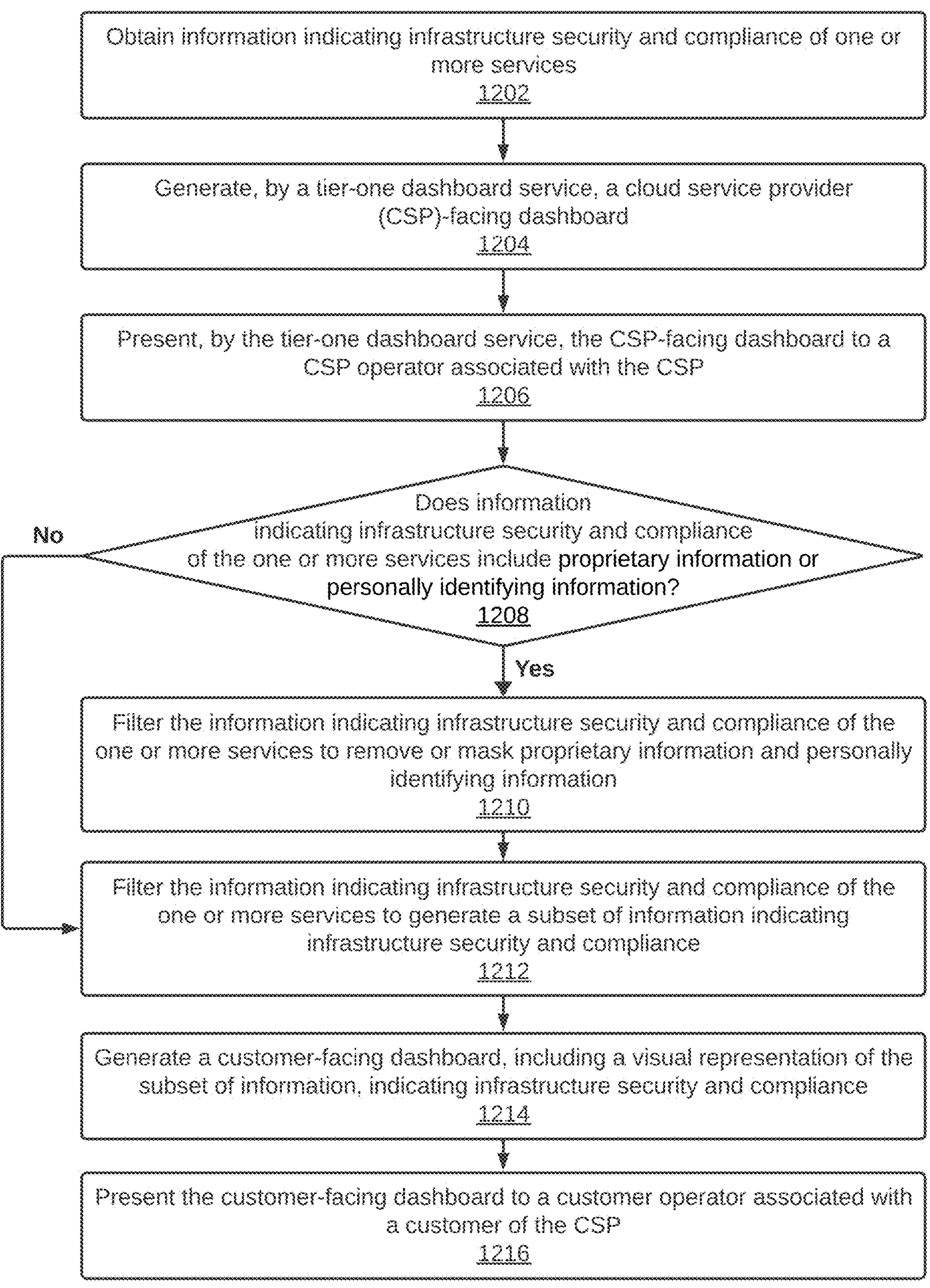
FIG. 12 illustrates an example set of operations for providing visibility into security and compliance of services in a customer cloud infrastructure environment to customers of the CSP in accordance with one or more embodiments.

4. Providing Customers Visibility into Security and Compliance of Services in a Customer Cloud Infrastructure Environment FIG. 12 illustrates an example set of operations for providing customers visibility into security and compliance of services in a customer cloud infrastructure environment in accordance with one or more embodiments. One or more operations illustrated in FIG. 12 may be modified, rearranged, or omitted. Accordingly, the particular sequence of operations illustrated in FIG. 12 should not be construed as limiting the scope of one or more embodiments.

One or more embodiments obtain information indicating infrastructure security of one or more services (Operation 1202). Information indicating infrastructure security and compliance of one or more services may be accomplished using data collectors placed throughout the cloud infrastructure environment. Data collectors may include various agents, scanners, detectors, and scanning engines. The infrastructure security and compliance information may include logs, audit logs, reports, and other information useful for identifying security breaches and threats to the infrastructure services and determining compliance of the infrastructure services. The information may be obtained in real time or near-real time. Real-time or near real-time information provides operators with access to up-to-date information.

One or more embodiments generate, by a tier-one dashboard service, a CSP-facing dashboard (Operation 1204). The tier-one dashboard service uses the information indicating security and compliance of the one or more services and displays the information on a dashboard that is viewable by CSP-operators. The tier-one dashboard service may include a single dashboard service for receiving information indicating security and compliance of the one or more services from the one or more services. Alternatively, the tier-one dashboard service may include a dashboard service for each of the one or more services.

One or more embodiments present, by the tier-one dashboard service, the CSP-facing dashboard to a CSP operator associated with the CSP (Operation 1206). The CSP-facing dashboard is made available to a CSP operator through a permissions service. The permissions service authenticates the CSP operator and authorizes access to the CSP-facing dashboard. Access to the CSP-facing dashboard allows a CSP operator to view the information indicating security and compliance of the one or more services. The CSP-facing dashboard may include a single dashboard for viewing information from the services or a dashboard for each of the services.

One or more embodiments determine if the information indicating infrastructure security of the one or more services include proprietary information or personally identifying information (Operation 1208). The information indicating infrastructure security and compliance of the one or more services may include proprietary information and personally identifying information. A privacy filtering engine of a tier-two dashboard service analyzes the security and compliance information and identifies proprietary and personally identifying information.

One or more embodiments filter the information indicating infrastructure security for the one or more services to remove or mask proprietary information and/or personally identifying information (Operation 1210). The privacy filtering engine removes or masks the identified proprietary information and personally identifying information.

One or more embodiments filter the information indicating infrastructure security and compliance of the one or more services to generate a subset of information indicating infrastructure security (Operation 1212). In addition to filtering the proprietary information and personally identifying information, a security insight engine may filter the infrastructure security and compliance information to identify security threats and breaches. A universal compliance engine may also filter the infrastructure security and compliance information to identify compliance issues and determine compliance status of the one or more infrastructure services. Filtering of the infrastructure security and compliance information obtained by the tier-two dashboard by the privacy filtering engine, the security insight engine, and the universal compliance engine generates the subset of information indicating infrastructure security and compliance.

One or more embodiments generate a customer-facing dashboard including a visual representation of the subset of information indicating infrastructure security (Operation 1214). A tier-two dashboard service uses the subset of information, indicating security and compliance of the one or more services, to create visual representations, e.g., tables, charts, and/or graphs of the subset of information, indicating infrastructure security. The tier-two dashboard service displays the information on a dashboard that is viewable by customer operators. The tier-two dashboard service may include one or more widgets for displaying the subset of information indicating security and compliance of the one or more services. The customer-facing dashboard may be customer customizable and may include a widget for each of the one or more infrastructure services.

One or more embodiments present the customer-facing dashboard to a customer operator associated with a customer of the CSP (Operation 1216). The customer-facing dashboard is made available to customer operators through the permissions service. The permissions service authenticates the customer operators and authorizes the customer operators access to the customer-facing dashboard. Access to the customer-facing dashboard allows customer operators to view the subset of information indicating security and compliance of the one or more services.

5. Example Customer-Facing Dashboard

A detailed example is described below for purposes of clarity. Components and/or operations described below should be understood as one specific example that may not be applicable to certain embodiments. Accordingly, components and/or operations described below should not be construed as limiting the scope of any of the claims.

FIG. 13 illustrates a dashboard provided to the operators and administrators associated with the customer of the CSP. As shown, the Security Oversight Dashboard 1300 provides customer operators and administrators with real-time or near real-time information related to the infrastructure security of the customer's cloud infrastructure environment. More particularly, the dashboard 1300 includes interfaces or widgets for providing security notifications 1302. The dashboard 1300 may also provide a security support tickets interface 1304 for customer operators to view and create support tickets to address security issues in the cloud infrastructure environment. The dashboard 1300 provides indication 1306 of the operational status of the systems within the cloud infrastructure environment. The dashboard 1300 may further provide an interface 1308 for a customer operator to seek help from a CSP operator.

6. Practical Applications, Advantages & Improvements

In one or more embodiments, customer-facing dashboards provide customer operators with insights and controls relevant to their specific services and environments. The customer-facing dashboard provides information about the performance of the services the customer is using, such as virtual machines, databases, and applications. The customer-facing dashboards provide visualization of the customer's resource usage and associated costs, helping them manage budgets and understand spending patterns. The customer-facing dashboards provide real-time or near real-time updates on the customer's compliance status with various standards and regulations that are relevant to their industry and data. The customer-facing dashboards provide specific alerts and reports about the security status of the customer's environment, including any incidents and the response to those incidents.

One or more embodiments improve the functioning of the cloud infrastructure environment. Information about security and compliance is essential to ensuring that the cloud infrastructure environment continues to operate as intended. When security and/or compliance issues arise, it is critical that those issues be addressed promptly. Techniques described herein provide security and/or compliance information directly to the customer, in real-time or near real-time, allowing the customer to act quickly to remediate issues that may arise. Thus, one or more embodiments reduce the cloud infrastructure environment's exposure to security and/or compliance issues that, if left unaddressed, could otherwise result in system downtime, data breaches, etc.

In one or more embodiments, customer facing dashboards are tailored to present the most relevant data to the customer operators, reducing clutter and enhancing usability. Customer operators are able to monitor and manage their specific resources and applications in real-time or near real-time.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media comprising instructions which, when executed by one or more hardware processors, cause performance of operations comprising:

obtaining, from a tier-one dashboard service, information indicating infrastructure security of a first set of one or more services;

wherein a first visual representation of the information indicating infrastructure security of the first set of one or more services is made available to a cloud service provider (CSP) via a CSP-facing dashboard;

filtering the information indicating infrastructure security of the first set of one or more services, obtained from the tier-one dashboard service, to generate a subset of the information indicating infrastructure security;

generating a first customer-facing dashboard comprising a second visual representation of the subset of the information indicating infrastructure security; and presenting the first customer-facing dashboard to a first customer operator associated with a first customer of the CSP, wherein the CSP is a first entity, the first customer of the CSP is a second entity, and the first customer of the CSP provides cloud services to an end user associated with a third entity.

2. The one or more non-transitory computer-readable media of claim 1, the operations further comprising:

obtaining, by the tier-one dashboard service, the information indicating infrastructure security of the first set of one or more services, wherein obtaining the information comprises:

monitoring the first set of one or more services; and obtaining logs of the first set of one or more services;

generating, by the tier-one dashboard service, the CSP-facing dashboard; and presenting, by the tier-one dashboard service, the CSP-facing dashboard to a CSP operator associated with the CSP.

3. The one or more non-transitory computer-readable media of claim 1, wherein based on one or more access policies, (a) the first customer-facing dashboard is accessible by the first customer operator, and (b) the CSP-facing dashboard is accessible by a CSP operator associated with the CSP and inaccessible by the first customer operator.

4. The one or more non-transitory computer-readable media of claim 1, the operations further comprising:

selecting, by the first customer of the CSP, a first compliance regime for the first set of one or more services, wherein the first customer-facing dashboard comprises a third visual representation of a first compliance status of the first set of one or more services according to the first compliance regime;

selecting, by a second customer of the CSP, a second compliance regime for a second set of one or more services;

generating a second customer-facing dashboard comprising a fourth visual representation of a second infrastructure status of the second set of one or more services, wherein the second customer-facing dashboard comprises a fifth visual representation of a second compliance status of the second set of one or more services according to the second compliance regime; and presenting the second customer-facing dashboard to a second customer operator associated with the second customer of the CSP.

5. The one or more non-transitory computer-readable media of claim 1, wherein filtering the information indicating infrastructure security comprises:

removing one or more of proprietary information or personally identifying information to generate the subset of the information indicating infrastructure security.

6. The one or more non-transitory computer-readable media of claim 1, wherein the first set of one or more services is hosted by the CSP.

7. The one or more non-transitory computer-readable media of claim 1, wherein the first customer of the CSP subscribes to the first set of one or more services.

8. The one or more non-transitory computer-readable media of claim 1, wherein the end user of the first customer of the CSP uses the first set of one or more services.

9. The one or more non-transitory computer-readable media of claim 1, wherein the information indicating infrastructure security is made available to the first customer-facing dashboard via one or more APIs associated with the tier-one dashboard service.

10. The one or more non-transitory computer-readable media of claim 1, wherein obtaining, from the tier-one dashboard service, the information indicating infrastructure security of the first set of one or more services comprises: making calls to one or more APIs associated with the tier-one dashboard service for the information indicating infrastructure security of the first set of one or more services.

11. The one or more non-transitory computer-readable media of claim 1, wherein the first set of one or more services comprises one or more of: a security service; an abuse detection service; a fraud detection service; or a compliance service.

12. A method comprising:

obtaining, from a tier-one dashboard service, information indicating infrastructure security of a first set of one or more services;

wherein a first visual representation of the information indicating infrastructure security of the first set of one or more services is made available to a cloud service provider (CSP) via a CSP-facing dashboard;

filtering the information indicating infrastructure security of the first set of one or more services, obtained from the tier-one dashboard service, to generate a subset of the information indicating infrastructure security;

generating a first customer-facing dashboard comprising a second visual representation of the subset of the information indicating infrastructure security;

presenting the first customer-facing dashboard to a first customer operator associated with a first customer of the CSP, and wherein the CSP is a first entity, the first customer of the CSP is a second entity, and the first customer of the CSP provides cloud services to an end user associated with a third entity, wherein the method is performed by at least one device including a hardware processor.

13. The method of claim 12, further comprising:

obtaining, by the tier-one dashboard service, the information indicating infrastructure security of the first set of one or more services, wherein obtaining the information comprises:

monitoring the first set of one or more services; and obtaining logs of the first set of one or more services;

generating, by the tier-one dashboard service, the CSP-facing dashboard; and presenting, by the tier-one dashboard service, the CSP-facing dashboard to a CSP operator associated with the CSP.

14. The method of claim 12, wherein based on one or more access policies, (a) the first customer-facing dashboard is accessible by the first customer operator, and (b) the CSP-facing dashboard is accessible by a CSP operator associated with the CSP and inaccessible by the first customer operator.

15. The method of claim 12, further comprising:

selecting, by the first customer of the CSP, a first compliance regime for the first set of one or more services, wherein the first customer-facing dashboard comprises a third visual representation of a first compliance status of the first set of one or more services according to the first compliance regime;

selecting, by a second customer of the CSP, a second compliance regime for a second set of one or more services;

generating a second customer-facing dashboard comprising a fourth visual representation of a second infrastructure status of the second set of one or more services, wherein the second customer-facing dashboard comprises a fifth visual representation of a second compliance status of the second set of one or more services according to the second compliance regime; and presenting the second customer-facing dashboard to a second customer operator associated with the second customer of the CSP.

16. The method of claim 12, wherein filtering the information indicating infrastructure security comprises:

removing one or more of proprietary information or personally identifying information to generate the subset of the information indicating infrastructure security.

17. The method of claim 12, wherein obtaining, from the tier-one dashboard service, the information indicating infrastructure security of the first set of one or more services comprises: making calls to one or more APIs associated with the tier-one dashboard service for the information indicating infrastructure security of the first set of one or more services.

18. A system comprising:

at least one device including a hardware processor; and the system being configured to perform operations comprising:

obtaining, from a tier-one dashboard service, information indicating infrastructure security of a first set of one or more services;

wherein a first visual representation of the information indicating infrastructure security of the first set of one or more services is made available to a cloud service provider (CSP) via a CSP-facing dashboard;

filtering the information indicating infrastructure security of the first set of one or more services, obtained from the tier-one dashboard service, to generate a subset of the information indicating infrastructure security;

generating a first customer-facing dashboard comprising a second visual representation of the subset of the information indicating infrastructure security; and presenting the first customer-facing dashboard to a first customer operator associated with a first customer of the CSP, wherein the CSP is a first entity, the first customer of the CSP is a second entity, and the first customer of the CSP provides cloud services to an end user associated with a third entity.

* * * * *